(12) United States Patent
Yamamoto et al.

(10) Patent No.: US 11,987,323 B2
(45) Date of Patent: May 21, 2024

(54) BICYCLE DERAILLEUR

(71) Applicant: SHIMANO INC., Sakai (JP)

(72) Inventors: Shunsuke Yamamoto, Sakai (JP); Akihiro Hasegawa, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/306,198

(22) Filed: Apr. 24, 2023

(65) Prior Publication Data

US 2023/0264782 A1   Aug. 24, 2023

Related U.S. Application Data

(63) Continuation of application No. 17/017,687, filed on Sep. 11, 2020, now Pat. No. 11,685,469.

(51) Int. Cl.
| | |
|---|---|
| *B62M 9/122* | (2010.01) |
| *B62M 6/45* | (2010.01) |
| *B62M 9/125* | (2010.01) |
| *B62M 25/00* | (2006.01) |
| *B62M 25/08* | (2006.01) |

(52) U.S. Cl.
CPC ............. *B62M 9/122* (2013.01); *B62M 6/45* (2013.01); *B62M 9/125* (2013.01); *B62M 25/08* (2013.01); *B62M 2025/003* (2013.01)

(58) Field of Classification Search
CPC ....... B62M 25/08; B62M 9/122; B62M 9/132
USPC ...................................... 474/80, 82
See application file for complete search history.

(56) References Cited

U.S. PATENT DOCUMENTS

| | | | | |
|---|---|---|---|---|
| 3,932,722 A | * | 1/1976 | Obata ................. | H01H 13/702 200/513 |
| 3,973,099 A | * | 8/1976 | Morris, Sr. ........... | H01H 13/12 368/308 |
| 4,677,268 A | * | 6/1987 | Nemeth ............... | H01H 13/702 200/513 |
| 4,952,761 A | * | 8/1990 | Viebrantz ............ | H01H 13/702 200/43.01 |

(Continued)

FOREIGN PATENT DOCUMENTS

DE    10 2020 213 221    6/2021

OTHER PUBLICATIONS

Office Action with Form PTO-892 Notice of References Cited issued by the U.S. Patent and Trademark Office for the U.S. Appl. No. 17/017,687, dated Sep. 7, 2022.

*Primary Examiner* — Henry Y Liu
(74) *Attorney, Agent, or Firm* — MORI & WARD, LLP

(57) ABSTRACT

A bicycle derailleur comprises a circuit board, an electrical user interface, a motor housing, and a motor unit. The electrical user interface includes a user accessing portion configured to receive a user input. The motor housing includes a motor accommodating space. The motor unit is provided in the motor accommodating space and configured to generate rotational force and configured to be electrically connected to the circuit board. A first direction is defined from the circuit board toward the electrical user interface or from the electrical user interface toward the circuit board. The plurality of second directions is defined to be perpendicular to the first direction. The motor unit is at least partly provided between the user accessing portion of the electrical user interface and the circuit board when viewed in at least one of the plurality of second directions.

13 Claims, 22 Drawing Sheets

(56) References Cited

U.S. PATENT DOCUMENTS

| | | | | |
|---|---|---|---|---|
| 5,172,114 | A * | 12/1992 | Bedoya | H01H 13/7006 |
| | | | | 200/345 |
| 6,626,473 | B1 * | 9/2003 | Klein | B29C 45/1676 |
| | | | | 292/347 |
| 7,761,212 | B2 * | 7/2010 | Takebayashi | H04L 12/403 |
| | | | | 482/57 |
| 8,979,683 | B2 * | 3/2015 | Katsura | B62M 25/08 |
| | | | | 474/82 |
| 9,394,030 | B2 * | 7/2016 | Shipman | B62M 9/132 |
| 9,890,838 | B2 * | 2/2018 | Shipman | F16H 9/06 |
| 10,894,574 | B2 * | 1/2021 | Brown | B62M 9/128 |
| 10,981,625 | B2 * | 4/2021 | Brown | B62M 1/36 |
| 2005/0189158 | A1 * | 9/2005 | Ichida | B62M 25/08 |
| | | | | 180/260 |
| 2005/0192137 | A1 * | 9/2005 | Ichida | B62M 9/132 |
| | | | | 474/70 |
| 2005/0192139 | A1 * | 9/2005 | Ichida | B62M 25/08 |
| | | | | 474/70 |
| 2005/0205323 | A1 * | 9/2005 | Ichida | B62M 9/132 |
| | | | | 474/80 |
| 2006/0100045 | A1 * | 5/2006 | Fukuda | B62M 25/08 |
| | | | | 474/70 |
| 2006/0183584 | A1 * | 8/2006 | Fukuda | B62M 25/08 |
| | | | | 474/70 |
| 2007/0184925 | A1 * | 8/2007 | Ichida | B62M 25/08 |
| | | | | 474/80 |
| 2014/0087901 | A1 * | 3/2014 | Shipman | B62M 9/131 |
| | | | | 429/100 |
| 2014/0114538 | A1 * | 4/2014 | Shipman | B62M 9/132 |
| | | | | 474/80 |
| 2014/0121047 | A1 * | 5/2014 | Katsura | B62M 9/132 |
| | | | | 74/405 |
| 2015/0111675 | A1 * | 4/2015 | Shipman | B62M 9/122 |
| | | | | 474/82 |
| 2015/0126314 | A1 * | 5/2015 | Pasqua | B62M 9/126 |
| | | | | 474/82 |
| 2017/0101155 | A1 * | 4/2017 | Tachibana | B62K 25/286 |
| 2017/0101162 | A1 * | 4/2017 | Tachibana | B62M 25/08 |
| 2017/0120983 | A1 * | 5/2017 | Komatsu | B62K 25/30 |
| 2018/0001960 | A1 * | 1/2018 | Pasqua | B62M 25/08 |
| 2018/0229803 | A1 * | 8/2018 | Wesling | B62M 9/132 |
| 2019/0100279 | A1 * | 4/2019 | Brown | B62M 9/127 |
| 2019/0100280 | A1 * | 4/2019 | Brown | B62M 1/36 |
| 2019/0144071 | A1 * | 5/2019 | Boehm | B62M 9/1242 |
| | | | | 474/80 |
| 2019/0217827 | A1 * | 7/2019 | Vandermolen | B62L 3/02 |
| 2020/0156737 | A1 * | 5/2020 | Liao | B62J 43/30 |
| 2020/0189688 | A1 * | 6/2020 | Rodgers | B62M 9/1242 |
| 2020/0298934 | A1 * | 9/2020 | Wu | B62M 9/132 |
| 2020/0346714 | A1 * | 11/2020 | Hahn | B62M 9/122 |
| 2021/0129937 | A1 * | 5/2021 | Sala | H02J 7/02 |
| 2021/0129938 | A1 * | 5/2021 | Sala | B62M 9/1242 |
| 2021/0171156 | A1 | 6/2021 | Kitano et al. | |
| 2021/0387696 | A1 * | 12/2021 | Sala | B62M 9/122 |

* cited by examiner

BICYCLE DERAILLEUR

CROSS-REFERENCE TO RELATED APPLICATIONS

The present application is a continuation application of U.S. patent application Ser. No. 17/017,687 filed Sep. 11, 2020. The contents of this application are incorporated herein by reference in their entirety.

BACKGROUND OF THE INVENTION

Field of the Invention

The present invention relates to a bicycle derailleur.

Discussion of the Background

A bicycle includes a derailleur configured to move a chain relative to a plurality of sprockets.

SUMMARY OF THE INVENTION

In accordance with a first aspect of the present invention, a bicycle derailleur comprises a circuit board, an electrical user interface, a motor housing, and a motor unit. The electrical user interface includes a user accessing portion configured to receive a user input. The motor housing includes a motor accommodating space. The motor unit is provided in the motor accommodating space and configured to generate rotational force and configured to be electrically connected to the circuit board. A first direction is defined from the circuit board toward the electrical user interface or from the electrical user interface toward the circuit board. The plurality of second directions is defined to be perpendicular to the first direction. The motor unit is at least partly provided between the user accessing portion of the electrical user interface and the circuit board when viewed in at least one of the plurality of second directions.

With the bicycle derailleur according to the first aspect, it is possible to efficiently arrange the motor unit, the electrical user interface, and the circuit board.

In accordance with a second aspect of the present invention, the bicycle derailleur according to the first aspect further comprises an informing unit configured to inform a user of information and configured to be electrically connected to the circuit board. The circuit board is at least partly provided between the user accessing portion of the electrical user interface and the informing unit when viewed in at least one of the plurality of second directions.

With the bicycle derailleur according to the second aspect, it is possible to efficiently arrange the circuit board, the electrical user interface, and the informing unit.

In accordance with a third aspect of the present invention, the bicycle derailleur according to the first aspect further comprises an informing unit configured to inform a user of information and configured to be electrically connected to the circuit board. The circuit board is at least partly provided between the motor unit and the informing unit when viewed in at least one of the plurality of second directions.

With the bicycle derailleur according to the third aspect, it is possible to efficiently arrange the circuit board, the motor unit, and the informing unit.

In accordance with a fourth aspect of the present invention, a bicycle derailleur comprises a circuit board, an electrical user interface, and an informing unit. The electrical user interface includes a user accessing portion configured to receive a user input. The informing unit is configured to inform a user of information and configured to be electrically connected to the circuit board. A first direction is defined from the informing unit toward the user accessing portion of the electrical user interface or from the user accessing portion of the electrical user interface toward the informing unit. A plurality of second directions is defined to be perpendicular to the first direction. The circuit board is at least partly provided between the user accessing portion of the electrical user interface and the informing unit when viewed in at least one of the plurality of second directions.

With the bicycle derailleur according to the fourth aspect, it is possible to efficiently arrange the circuit board, the electrical user interface, and the informing unit.

In accordance with a fifth aspect of the present invention, a bicycle derailleur comprises a circuit board, an electrical user interface, and an informing unit. The circuit board has a center plane that bisects a thickness of the circuit board. The electrical user interface includes a user accessing portion configured to receive a user input. The electrical user interface is disposed in a first spatial region with respect to the center plane of the circuit board. The informing unit is configured to inform a user of information and is configured to be electrically connected to the circuit board. The informing unit is disposed in a second spatial region opposite to the first spatial region with respect to the center plane of the circuit board.

With the bicycle derailleur according to the fifth aspect, it is possible to efficiently arrange the circuit board, the electrical user interface, and the informing unit.

In accordance with a sixth aspect of the present invention, the bicycle derailleur according to the fourth aspect further comprises a motor unit configured to generate rotational force and configured to be electrically connected to the circuit board. The circuit board is at least partly provided between the motor unit and the informing unit when viewed in at least one of the plurality of second directions.

With the bicycle derailleur according to the sixth aspect, it is possible to efficiently arrange the circuit board, the motor unit, and the informing unit.

In accordance with a seventh aspect of the present invention, a bicycle derailleur comprises a circuit board, a motor unit, and an informing unit. The motor unit is configured to generate rotational force and configured to be electrically connected to the circuit board. The informing unit is configured to inform a user of information and configured to be electrically connected to the circuit board. A first direction is defined from the circuit board toward the electrical user interface or from the electrical user interface toward the circuit board. A plurality of second directions is defined to be perpendicular to the first direction. The circuit board is at least partly provided between the motor unit and the informing unit when viewed in at least one of the plurality of second directions.

With the bicycle derailleur according to the seventh aspect, it is possible to efficiently arrange the circuit board, the motor unit, and the informing unit.

In accordance with an eighth aspect of the present invention, a bicycle derailleur comprises a circuit board, a motor unit, and an informing unit. The circuit board has a center plane that bisects a thickness of the circuit board. The motor unit is configured to generate rotational force and is configured to be electrically connected to the circuit board. The motor unit is disposed in a first spatial region with respect to the center plane of the circuit board. The informing unit is configured to inform a user of information and is configured to be electrically connected to the circuit board. The informing unit is disposed in a second spatial region opposite to the first spatial region with respect to the center plane of the circuit board.

With the bicycle derailleur according to the eighth aspect, it is possible to efficiently arrange the circuit board, the motor unit, and the informing unit.

In accordance with a ninth aspect of the present invention, the bicycle derailleur according to the second, third, or seventh aspect further comprises an informing unit configured to inform a user of information and configured to be electrically connected to the circuit board. The motor unit is at least partly provided between the user accessing portion of the electrical user interface and the informing unit when viewed in at least one of the plurality of second directions.

With the bicycle derailleur according to the ninth aspect, it is possible to efficiently arrange the motor unit, the electrical user interface, and the informing unit.

In accordance with a tenth aspect of the present invention, the bicycle derailleur according to any one of the second to ninth aspects is configured so that the informing unit includes a light emitter and a light transmission member. The light emitter is configured to emit light and is configured to be electrically connected to the circuit board. The light transmission member is configured to transmit light emitted from the light emitter.

With the bicycle derailleur according to the tenth aspect, it is possible to reliably transmit light emitted from the light emitter to a place where the user can see the transmitted light.

In accordance with an eleventh aspect of the present invention, the bicycle derailleur according to any one of the first to third and sixth to tenth aspects is configured so that the motor unit includes a motor and a gear structure. The motor is configured to generate rotational force. The gear structure is configured to change the rotational force based on a reduction ratio. The gear structure is at least partly provided between the user accessing portion of the electrical user interface and the circuit board when viewed in at least one of the plurality of second directions.

With the bicycle derailleur according to the eleventh aspect, it is possible to efficiently arrange the gear structure, the electrical user interface, and the circuit board.

In accordance with a twelfth aspect of the present invention, the bicycle derailleur according to the eleventh aspect is configured so that the gear structure includes a gear support and a plurality of gears configured to be rotatably attached to the gear support. The gear support is at least partly provided between the user accessing portion of the electrical user interface and the circuit board when viewed in at least one of the plurality of second directions.

With the bicycle derailleur according to the twelfth aspect, it is possible to efficiently arrange the gear support, the electrical user interface, and the circuit board.

In accordance with a thirteenth aspect of the present invention, the bicycle derailleur according to the twelfth aspect is configured so that the gear support is at least partly provided between the motor and the circuit board when viewed in at least one of the plurality of second directions.

With the bicycle derailleur according to the thirteenth aspect, it is possible to efficiently arrange the gear support, the motor, and the circuit board.

In accordance with a fourteenth aspect of the present invention, the bicycle derailleur according to any one of the first to thirteenth aspects further comprises a base member configured to be mounted to a bicycle frame. The electrical user interface is configured to be movably mounted to at least one of the motor unit and the base member.

With the bicycle derailleur according to the fourteenth aspect, it is possible to receive the user input using the electrical user interface.

In accordance with a fifteenth aspect of the present invention, the bicycle derailleur according to the fourteenth aspect is configured so that the motor unit includes a motor and a gear structure. The motor is configured to generate rotational force. The gear structure is configured to change the rotational force based on a reduction ratio. At least one of the motor and the gear structure is at least partly provided in the motor accommodating space. The electrical user interface is configured to be movably mounted to at least one of the motor housing, the gear structure, and the base member.

With the bicycle derailleur according to the fifteenth aspect, it is possible to reliably receive the user input using the electrical user interface.

In accordance with a sixteenth aspect of the present invention, the bicycle derailleur according to the fifteenth aspect is configured so that the gear structure includes a gear support and a plurality of gears configured to be rotatably attached to the gear support. The electrical user interface is configured to be movably mounted to at least one of the motor housing, the gear support, and the base member.

With the bicycle derailleur according to the sixteenth aspect, it is possible to reliably receive the user input using the electrical user interface.

In accordance with a seventeenth aspect of the present invention, the bicycle derailleur according to the fifteenth or sixteenth aspect is configured so that the circuit board is at least partly provided in the motor accommodating space.

With the bicycle derailleur according to the seventeenth aspect, it is possible to protect the circuit board using the motor housing.

In accordance with an eighteenth aspect of the present invention, the bicycle derailleur according to any one of the fifteenth to seventeenth aspects is configured so that the motor housing is configured to be attached to the base member.

With the bicycle derailleur according to the eighteenth aspect, it is possible to stabilize the posture of the motor housing relative to the base member.

In accordance with a nineteenth aspect of the present invention, the bicycle derailleur according to any one of the fourteenth to eighteenth aspects further comprises an electric port configured to be electrically connected to an electric cable and provided to at least one of the base member and the motor housing.

With the bicycle derailleur according to the nineteenth aspect, it is possible to connect the electric cable to at least one of the base member and the motor unit.

In accordance with a twentieth aspect of the present invention, the bicycle derailleur according to the nineteenth aspect is configured so that the electric port is configured to receive electric power through the electric cable.

With the bicycle derailleur according to the twentieth aspect, it is possible to supply electric power to the bicycle derailleur through the electric cable.

In accordance with a twenty-first aspect of the present invention, the bicycle derailleur according to the nineteenth or twentieth aspect is configured so that the electric port is configured to receive charging power through the electric cable.

With the bicycle derailleur according to the twenty-first aspect, it is possible to supply charging power to the bicycle derailleur through the electric cable.

In accordance with a twenty-second aspect of the present invention, the bicycle derailleur according to any one of the fourteenth to twenty-first aspects further comprises a movable member movably coupled to the base member. The electrical user interface is configured to be provided to at least one of the base member and the movable member.

With the bicycle derailleur according to the twenty-second aspect, it is possible to efficiently arrange the electrical user interface depending on the base member and the movable member.

In accordance with a twenty-third aspect of the present invention, a bicycle derailleur comprises a circuit board and an electrical user interface. The electrical user interface is configured to receive a user input. The electrical user interface includes a switch circuit, a button, and an elastic member. The switch circuit is configured to be electrically connected to the circuit board. The button is configured to be movable relative to the switch circuit. The elastic member is at least partly provided between the switch circuit and the button.

With the bicycle derailleur according to the twenty-third aspect, it is possible to reduce impact applied to the switch circuit from the button using the elastic member.

In accordance with a twenty-fourth aspect of the present invention, the bicycle derailleur according to the twenty-third aspect is configured so that the elastic member is configured to be contactable with the switch circuit.

With the bicycle derailleur according to the twenty-fourth aspect, it is possible to reliably reduce impact applied to the switch circuit from the button using the elastic member.

In accordance with a twenty-fifth aspect of the present invention, the bicycle derailleur according to the twenty-third or twenty-fourth aspect is configured so that the switch circuit includes a first contact and a second contact configured to be contactable with the first contact in response to force applied from the button to the second contact. The elastic member is at least partly provided between the second contact and the button.

With the bicycle derailleur according to the twenty-fifth aspect, it is possible to reliably reduce impact applied to the second contact from the button using the elastic member.

In accordance with a twenty-sixth aspect of the present invention, the bicycle derailleur according to any one of the twenty-third to twenty-fifth aspects is configured so that the switch circuit is made of a first material. The button is made of a second material. The elastic member is made of a third material. The third material is softer than at least one of the first material and the second material.

With the bicycle derailleur according to the twenty-sixth aspect, it is possible to reliably reduce impact applied to the switch circuit from the button using the elastic member.

In accordance with a twenty-seventh aspect of the present invention, the bicycle derailleur according to the twenty-sixth aspect is configured so that the first material includes a metallic material. The second material includes a metallic material. The third material includes a non-metallic material.

With the bicycle derailleur according to the twenty-seventh aspect, it is possible to reliably reduce impact applied to the switch circuit from the button using the elastic member made of the non-metallic material.

In accordance with a twenty-seventh aspect of the present invention, the bicycle derailleur according to the twenty-sixth or twenty-seventh aspect is configured so that the third material includes an elastomer.

With the bicycle derailleur according to the twenty-seventh aspect, it is possible to reliably reduce impact applied to the switch circuit from the button using the elastic member including the elastomer.

In accordance with a twenty-ninth aspect of the present invention, the bicycle derailleur according to any one of the twenty-third to twenty-eighth aspects further comprises a base member and a movable member. The base member is configured to be mounted to a bicycle frame. The movable member is movably coupled to the base member. The circuit board and the electrical user interface are provided to at least one of the base member and the movable member.

With the bicycle derailleur according to the twenty-ninth aspect, it is possible to efficiently arrange the circuit board and the electrical user interface depending on the base member and the movable member.

In accordance with a thirtieth aspect of the present invention, the bicycle derailleur according to the twenty-ninth aspect further comprises a motor unit configured to be electrically connected to the circuit board. The motor unit is provided to at least one of the base member and the movable member.

With the bicycle derailleur according to the thirtieth aspect, it is possible to efficiently arrange the motor unit depending on the base member and the movable member.

In accordance with a thirty-first aspect of the present invention, the bicycle derailleur according to the thirtieth aspect further comprises a motor housing including a motor accommodating space. The motor unit is provided in the motor accommodating space and includes a motor and a gear structure. The motor is configured to generate rotational force. The gear structure is configured to change the rotational force based on a reduction ratio. At least one of the motor and the gear structure is at least partly provided in the motor accommodating space. The elastic member is movably mounted to at least one of the motor housing and the gear structure.

With the bicycle derailleur according to the thirty-first aspect, it is possible to support the elastic member by at least one of the motor housing and the gear structure.

In accordance with a thirty-second aspect of the present invention, the bicycle derailleur according to the thirty-first aspect is configured so that the gear structure includes a gear support and a plurality of gears configured to be rotatably attached to the gear support. The elastic member is movably mounted to at least one of the motor housing and the gear support.

With the bicycle derailleur according to the thirty-second aspect, it is possible to effectively reduce impact applied from the button to the electrical user interface using the elastic member.

In accordance with a thirty-third aspect of the present invention, the bicycle derailleur according to the thirty-second aspect is configured so that the at least one of the motor housing and the gear support includes a support hole. The elastic member is movably provided in the support hole.

With the bicycle derailleur according to the thirty-third aspect, it is possible to reliably support the elastic member by the support hole.

In accordance with a thirty-fourth aspect of the present invention, the bicycle derailleur according to any one of the twenty-third to thirty-third aspects is configured so that the electrical user interface includes a biasing member configured to bias the button to move away from the switch circuit.

With the bicycle derailleur according to the thirty-fourth aspect, it is possible to keep the button in an rest position.

In accordance with a thirty-fifth aspect of the present invention, a bicycle derailleur comprises a circuit board, an electrical user interface, and a motor unit. The electrical user interface includes a user accessing portion configured to receive a user input. The motor unit is configured to generate rotational force and is configured to be electrically connected to the circuit board. A minimum spacing distance defined between the circuit board and a distal end portion of the electrical user interface is equal to larger than 5 mm.

With the bicycle derailleur according to the thirty-fifth aspect, it is possible to efficiently arrange the circuit board and the electrical user interface.

In accordance with a thirty-sixth aspect of the present invention, the bicycle derailleur according to the thirty-fifth aspect is configured so that the minimum spacing distance is equal to smaller than 18.5 mm.

With the bicycle derailleur according to the thirty-sixth aspect, it is possible to more efficiently arrange the circuit board and the electrical user interface.

In accordance with a thirty-seventh aspect of the present invention, a bicycle derailleur comprises a circuit board, an informing unit, a motor housing, and a motor unit. The circuit board has a center plane that bisects a thickness of the circuit board. The informing unit is configured to inform a user of information and is configured to be electrically connected to the circuit board. The motor housing includes a motor accommodating space. The motor unit is provided in the motor accommodating space. The motor unit is configured to generate rotational force and is configured to be electrically connected to the circuit board. The motor unit is at least partly provided between the informing unit and the circuit board in a reference direction perpendicular to the center plane of the circuit board.

With the bicycle derailleur according to the thirty-seventh aspect, it is possible to efficiently arrange the motor unit, the circuit board, and the informing unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
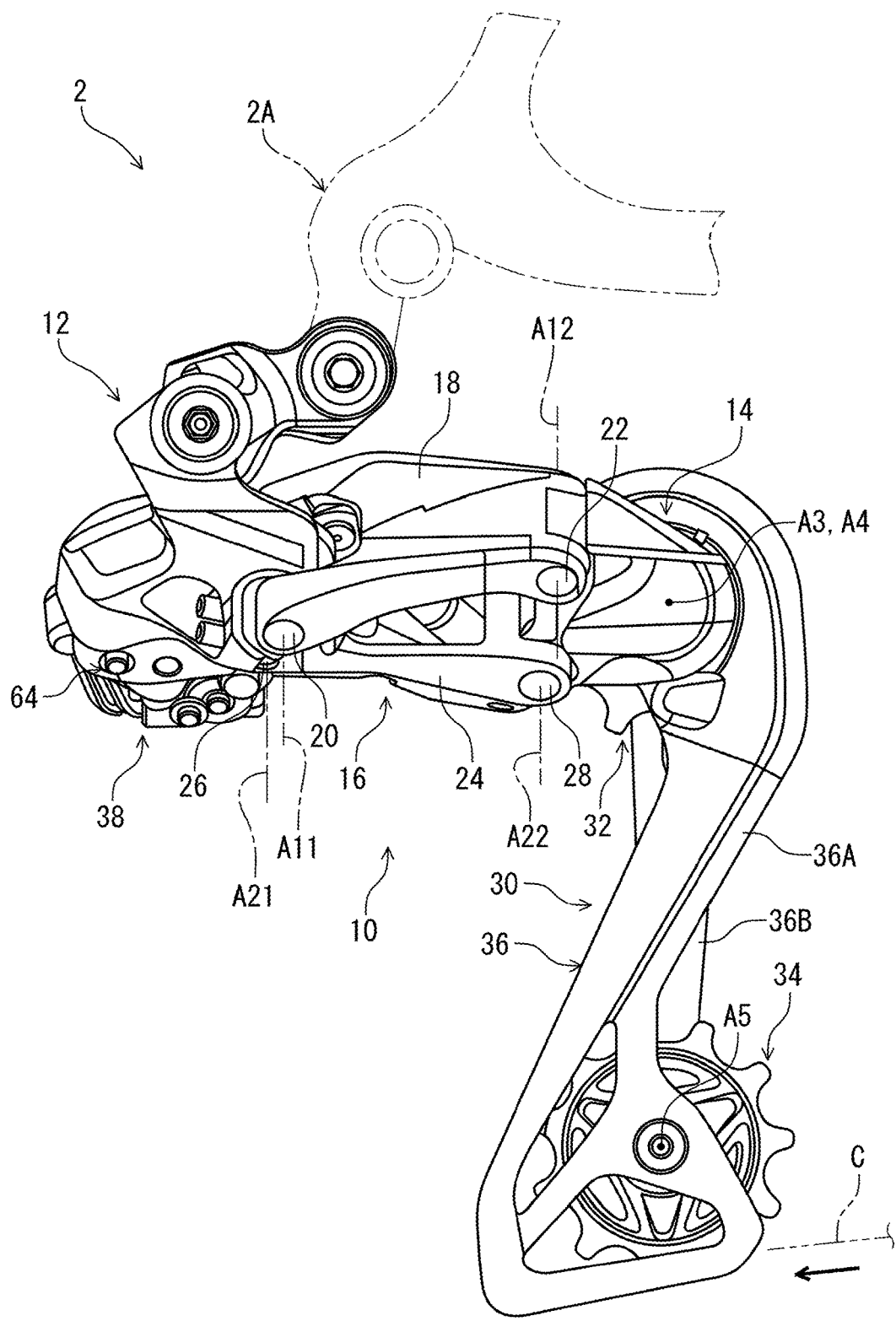
FIG. 1 is a side elevational view of a bicycle including a bicycle derailleur in accordance with an embodiment.

The embodiment(s) will now be described with reference to the accompanying drawings, wherein like reference numerals designate corresponding or identical elements throughout the various drawings.

Referring initially to FIG. 1, a bicycle derailleur 10 is configured to be mounted to a bicycle frame 2A of a bicycle 2. The bicycle 2 includes a mountain bike, a road bike, a city bike, a tricycle, a cargo bike, a recumbent bike, or any type of bicycles. In the present embodiment, the bicycle derailleur 10 is a rear derailleur. However, the structure of the bicycle derailleur 10 can apply to other derailleurs such as a front derailleur.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the bicycle with facing a handlebar. Accordingly, these terms, as utilized to describe the bicycle derailleur 10 or other components, should be interpreted relative to the bicycle 2 equipped with the bicycle derailleur 10 as used in an upright riding position on a horizontal surface.

The bicycle derailleur 10 comprises a base member 12. The base member 12 is configured to be mounted to the bicycle frame 2A. The bicycle derailleur 10 further comprises a movable member 14. The movable member 14 is movably coupled to the base member 12.

The bicycle derailleur 10 comprises a linkage structure 16. The linkage structure 16 is configured to movably couple the movable member 14 to the base member 12. The linkage structure 16 includes at least one linkage axis.

In the present embodiment, the linkage structure 16 includes a first link 18, a first link pin 20, a first additional link pin 22, a second link 24, a second link pin 26, and a second additional link pin 28. The first link 18 is pivotally coupled to the base member 12 about a first linkage axis A11 with the first link pin 20. The second link 24 is pivotally coupled to the base member 12 about a second linkage axis A21 with the second link pin 26. The first link 18 is pivotally coupled to the movable member 14 about a first additional linkage axis A12 with the first additional link pin 22. The second link 24 is pivotally coupled to the movable member 14 about a second additional linkage axis A22 with the second additional link pin 28.

Figure 2:
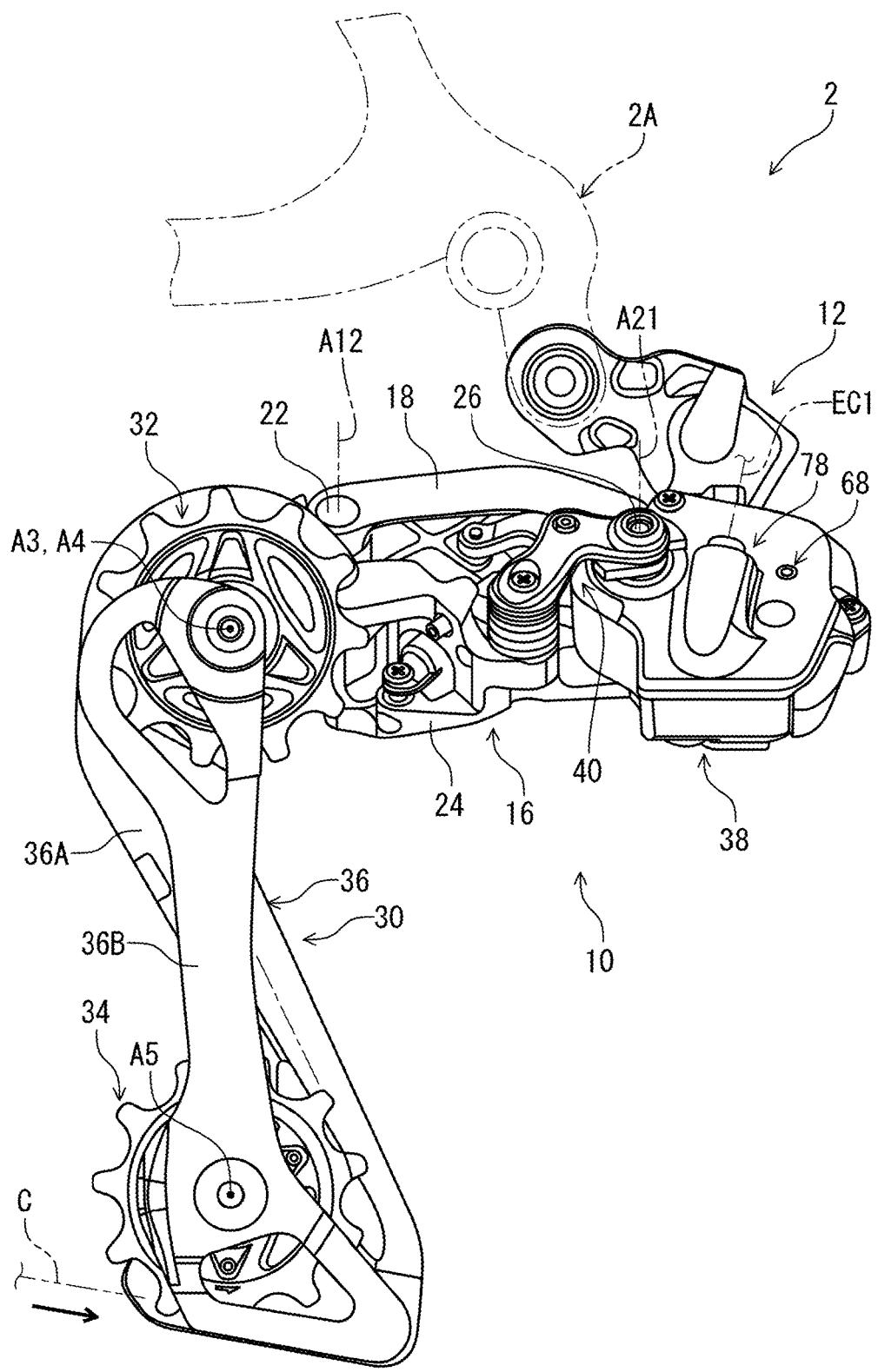
FIG. 2 is another side elevational view of the bicycle illustrated in FIG. 1.

As seen in FIG. 2, the bicycle derailleur 10 comprises a chain guide 30. The chain guide 30 is pivotally disposed on the movable member 14. The chain guide 30 is pivotable relative to the movable member 14 about a chain-guide axis A3. The chain guide 30 includes a guide pulley 32, a tension pulley 34, and a guide member 36. The guide member 36 is pivotally coupled to the movable member 14 about the chain-guide axis A3. The guide pulley 32 is rotatably coupled to the guide member 36 about a guide pulley axis A4. The tension pulley 34 is rotatably coupled to the guide member 36 about a tension pulley axis A5. The guide pulley 32 and the tension pulley 34 are configured to be engaged with a chain C.

The bicycle derailleur 10 further comprises an actuator 38. The actuator 38 is configured to be coupled to at least one of the movable member 14 and the linkage structure 16 to move the movable member 14 relative to the base member 12. In the present embodiment, the actuator 38 is configured to be coupled to the second link 24 of the linkage structure 16 to move the movable member 14 relative to the base member 12. However, the actuator 38 can be configured to be coupled to the movable member 14 or both the movable member 14 and the linkage structure 16 to move the movable member 14 relative to the base member 12.

The bicycle derailleur 10 comprises a saver structure 40 configured to protect the actuator 38 from overload. The actuator 38 is configured to be coupled to the second link 24 of the linkage structure 16 via the saver structure 40. The saver structure 40 has a transmission state and a non-transmission state. In the transmission state, the saver structure 40 is configured to transmit a drive force of the actuator 38 to the linkage structure 16 to move the movable member 14 with respect to the base member 12. In the non-transmission state, the saver structure 40 is configured to cut off the transmission of the drive force from the actuator 38 to the linkage structure 16. Since the saver structure 40 includes a structure which has been known in the bicycle field, it will not be described in detail here for the sake of brevity.

Figure 3:
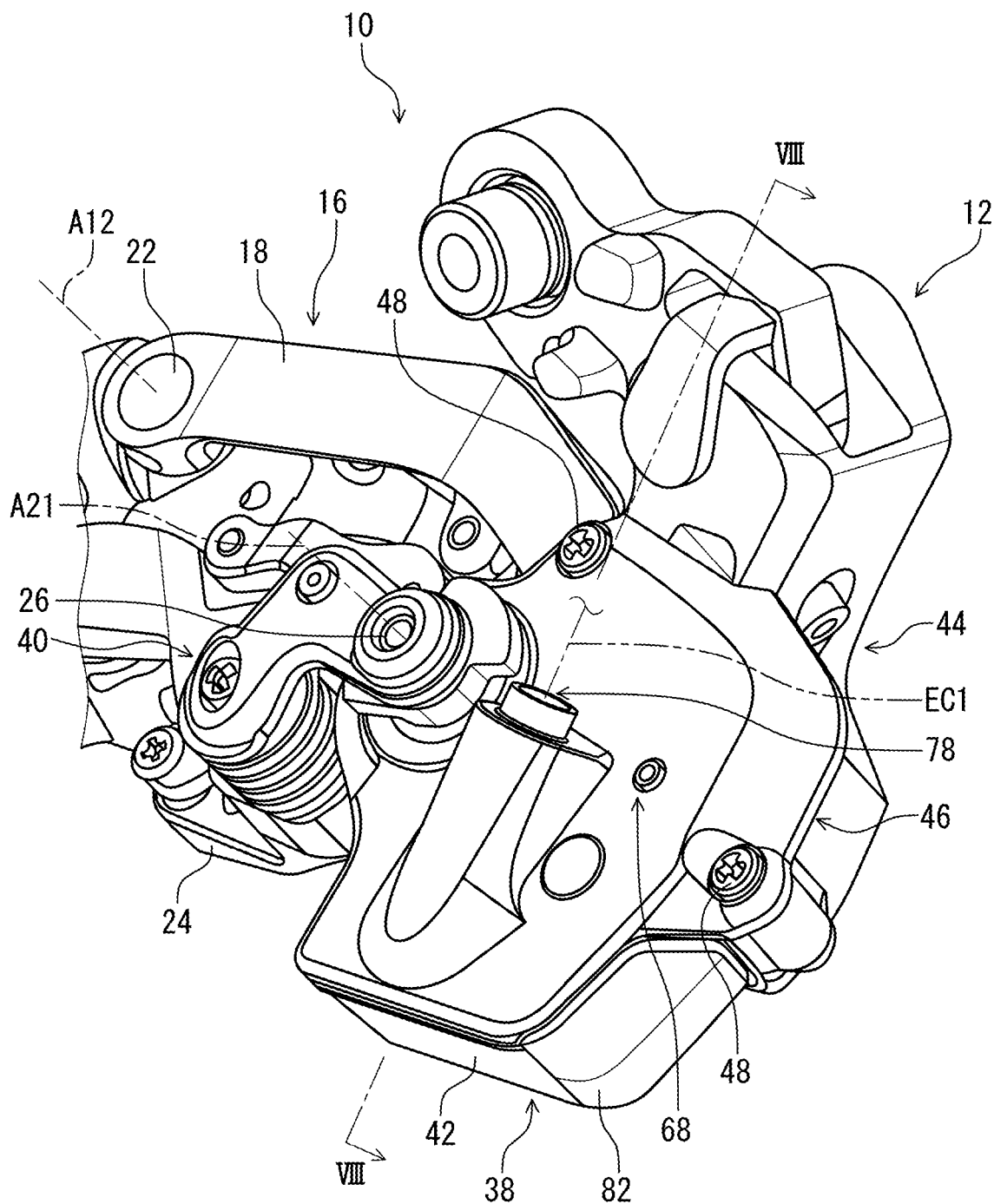
FIG. 3 is a perspective view of the bicycle derailleur illustrated in FIG. 1.
Figure 4:
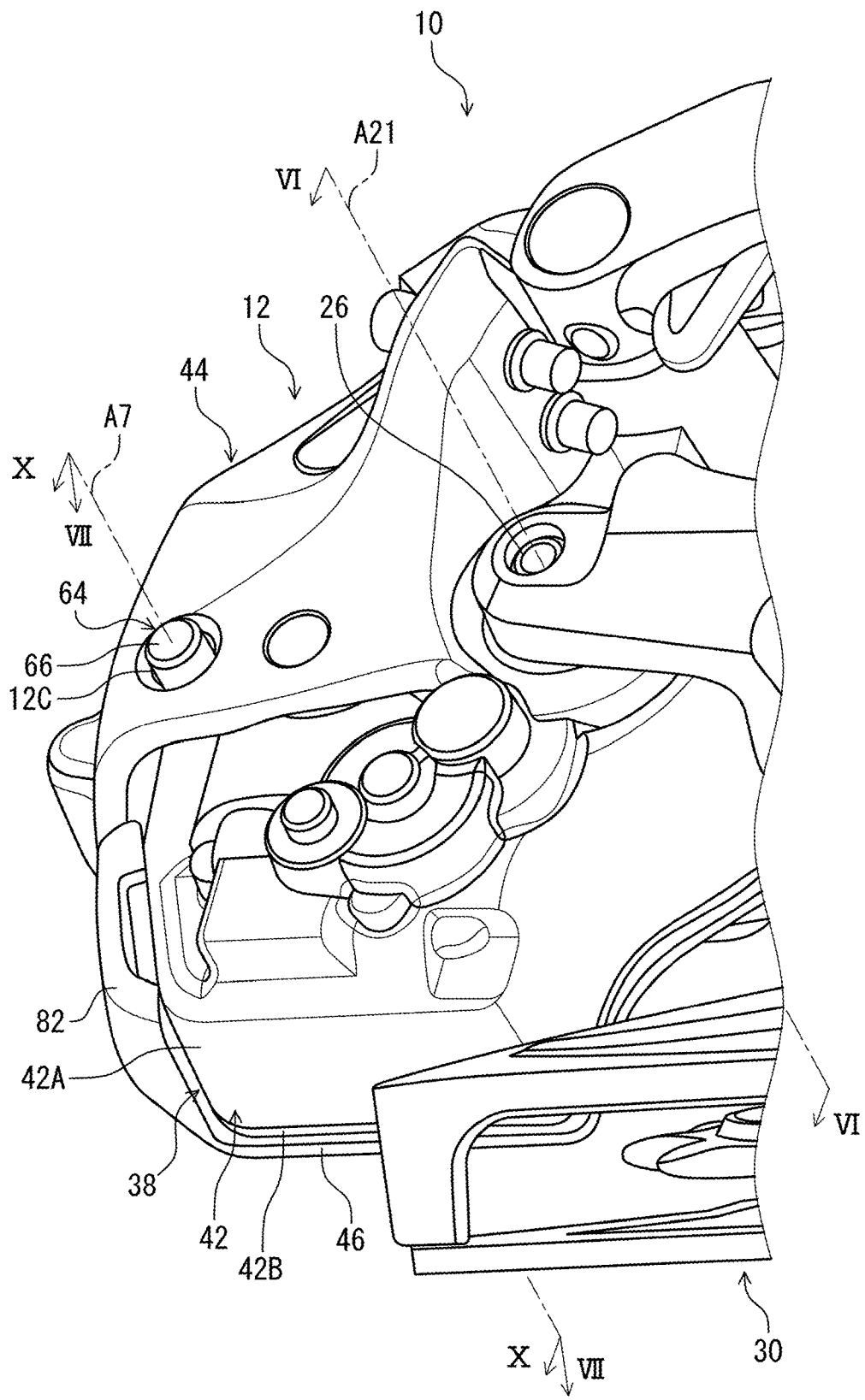
FIG. 4 is another perspective view of the bicycle derailleur illustrated in FIG. 1.

As seen in FIGS. 3 and 4, the actuator 38 includes a motor housing 42. Namely, the bicycle derailleur 10 comprises the motor housing 42. The motor housing 42 is configured to be attached to the base member 12. The base member 12 includes a first base member 44 and a second base member 46. The second base member 46 is a separate member from the first base member 44. The second base member 46 is configured to be detachably attached to the first base member 44. As seen in FIG. 3, the second base member 46 is secured to the first base member 44 with a plurality of fasteners such as screws 48. The motor housing 42 is held between the first base member 44 and the second base member 46.

Figure 5:
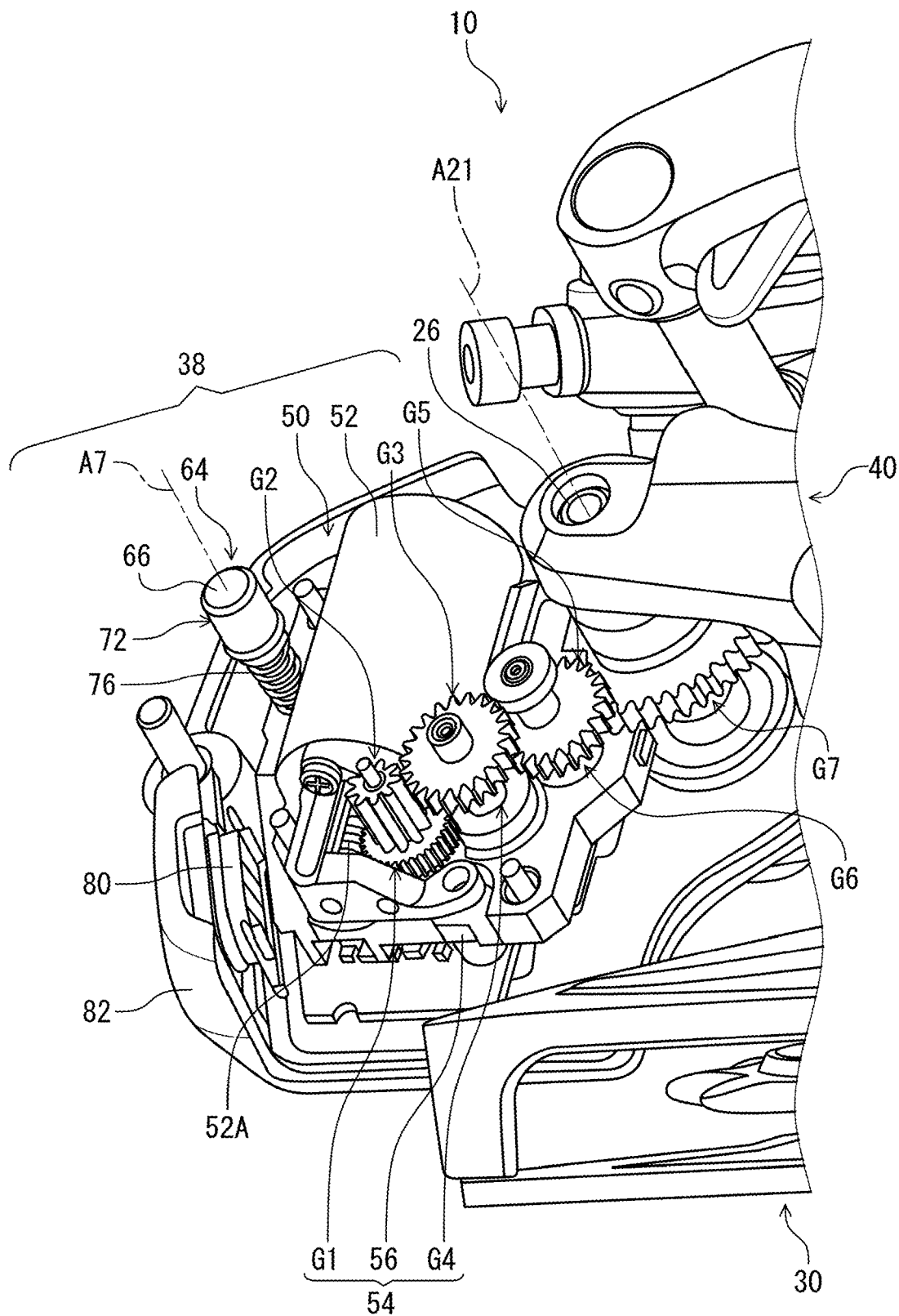
FIG. 5 is a perspective view of the bicycle derailleur illustrated in FIG. 1, with a base member and a motor housing partly omitted.

As seen in FIG. 5, the actuator 38 includes a motor unit 50. Namely, the bicycle derailleur 10 comprises the motor unit 50. The motor unit 50 is configured to generate rotational force. The motor unit 50 includes a motor 52 and a gear structure 54. The motor 52 is configured to generate rotational force. The gear structure 54 is configured to change the rotational force based on a reduction ratio.

The gear structure 54 includes a gear support 56 and a plurality of gears G1 to G7 configured to be rotatably attached to the gear support 56. The motor 52 includes an output shaft 52A having a geared part. For example, the geared part of the output shaft 52A includes a worm gear. The gear G1 meshes with the geared part of the output shaft 52A of the motor 52. The gear G1 is rotatable relative to the motor housing 42 along with the gear G2. The gear G2 meshes with the gear G3. The gear G3 is rotatable relative to the motor housing 42 along with the gear G4. The gear G4 meshes with the gear G5. The gear G5 is rotatable relative to the motor housing 42 along with the gear G6. The gear G6 meshes with the gear G7. The gear G7 is secured to the second link pin 26 of the linkage structure 16. The second link pin 26 is coupled to the saver structure 40 to transmit rotational force transmitted from the motor unit 50 to the saver structure 40. The reduction ratio is defined by the geared part of the output shaft 52A and the plurality of gears G1 to G7.

Figure 6:
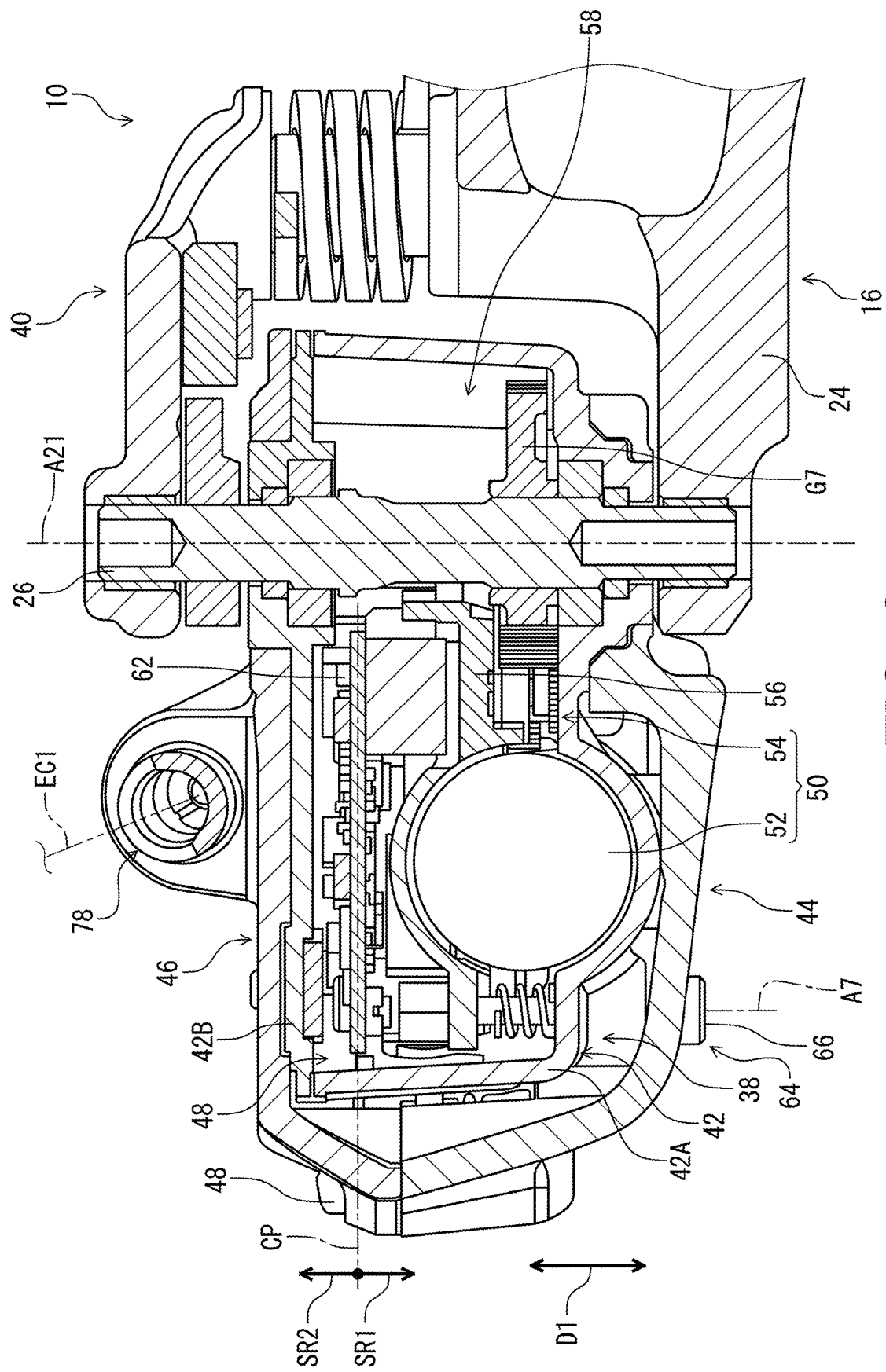
FIG. 6 is a cross-sectional view of the bicycle derailleur along line VI-VI of FIG. 4.

As seen in FIG. 6, the motor housing 42 includes a motor accommodating space 58. The motor unit 50 is provided in the motor accommodating space 58. At least one of the motor 52 and the gear structure 54 is at least partly provided in the motor accommodating space 58. In the present embodiment, the motor 52 is entirely provided in the motor accommodating space 58. The gear structure 54 is entirely provided in the motor accommodating space 58. However, at least one of the motor 52 and the gear structure 54 can be at least partly provided outside the motor accommodating space 58.

The motor housing 42 includes a first motor housing 42A and a second motor housing 42B. The second motor housing 42B is a separate member from the first motor housing 42A. The second motor housing 42B is secured to the first motor housing 42A with fasteners such as screws. The first motor housing 42A and the second motor housing 42B define the motor accommodating space 58.

Figure 7:
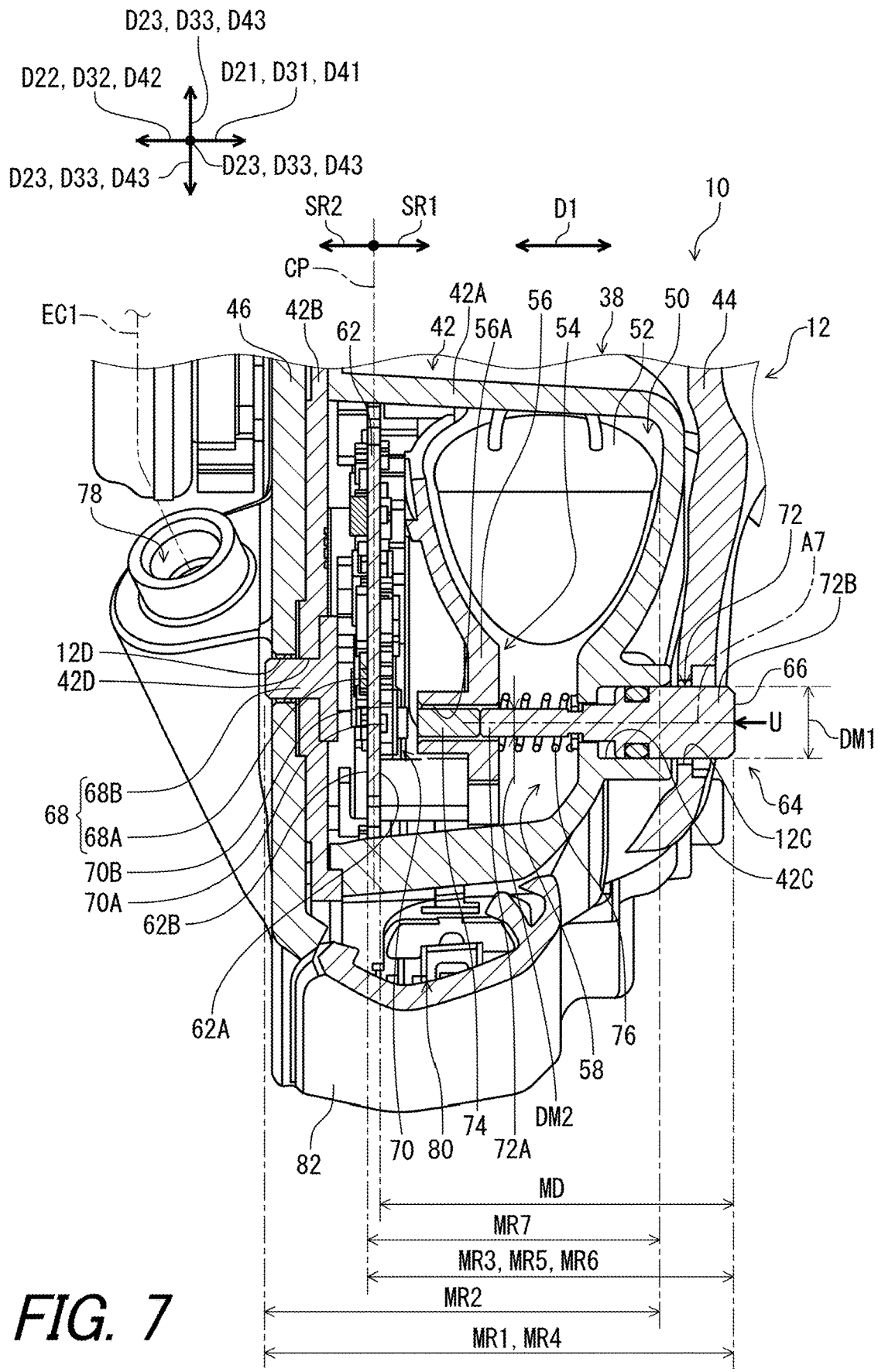
FIG. 7 is a cross-sectional view of the bicycle derailleur along line VII-VII of FIG. 4.

As seen in FIG. 7, the bicycle derailleur 10 comprises a circuit board 62. The bicycle derailleur 10 comprises an electrical user interface 64. The electrical user interface 64 is configured to receive a user input U. The electrical user interface 64 includes a user accessing portion 66 configured to receive the user input U. The motor unit 50 is configured to be electrically connected to the circuit board 62. The electrical user interface 64 is configured to be electrically connected to the circuit board 62. The electrical user interface 64 is configured to be mechanically contact the circuit board 62.

The bicycle derailleur 10 comprises an informing unit 68. The informing unit 68 is configured to inform a user of information. The informing unit 68 is configured to be electrically connected to the circuit board 62.

The circuit board 62 is at least partly provided in the motor accommodating space 58. The motor unit 50 is at least partly provided in the motor accommodating space 58. At least one of the motor 52 and the gear structure 54 is at least partly provided in the motor accommodating space 58. The electrical user interface 64 is at least partly provided in the motor accommodating space 58. The informing unit 68 is at least partly provided in the motor accommodating space 58.

In the present embodiment, the circuit board 62 is entirely provided in the motor accommodating space 58. The motor unit 50 is entirely provided in the motor accommodating space 58. The motor 52 and the gear structure 54 are entirely provided in the motor accommodating space 58. The electrical user interface 64 is partly provided in the motor accommodating space 58. The informing unit 68 is partly provided in the motor accommodating space 58. However, the circuit board 62 can be partly provided in the motor accommodating space 58 if needed and/or desired. The motor unit 50 can be partly provided in the motor accommodating space 58. At least one of the motor 52 and the gear structure 54 can be partly provided in the motor accommodating space 58 if needed and/or desired. The electrical user interface 64 can be entirely provided in the motor accommodating space 58 if needed and/or desired. The informing unit 68 can be entirely provided in the motor accommodating space 58 if needed and/or desired.

As seen in FIG. 7, the electrical user interface 64 is configured to be movably mounted to at least one of the motor unit 50 and the base member 12. The electrical user interface 64 is configured to be movably mounted to at least one of the motor housing 42, the gear structure 54, and the base member 12. The electrical user interface 64 is configured to be movably mounted to at least one of the motor housing 42, the gear support 56, and the base member 12.

In the present embodiment, the electrical user interface 64 is configured to be movably mounted to the motor unit 50 and the base member 12. The electrical user interface 64 is configured to be movably mounted to the motor housing 42, the gear structure 54, and the base member 12. The electrical user interface 64 is configured to be movably mounted to the motor housing 42, the gear support 56, and the base member 12. However, the arrangement of the electrical user interface 64 is not limited to the above arrangements.

The electrical user interface 64 includes a switch circuit 70, a button 72, and an elastic member 74. The switch circuit 70 is configured to be electrically connected to the circuit board 62. The button 72 is configured to be movable relative to the switch circuit 70. The elastic member 74 is at least partly provided between the switch circuit 70 and the button 72. The elastic member 74 is configured to be contactable with the switch circuit 70. The electrical user interface 64 includes a biasing member 76 configured to bias the button 72 to move away from the switch circuit 70. The biasing member 76 is provided between the motor housing 42 and the gear support 56 of the gear structure 54.

The button 72 is movably mounted to the motor unit 50 and the base member 12. The button 72 is movably mounted to the motor housing 42, the gear structure 54, and the base member 12. The button 72 is movably mounted to the motor housing 42, the gear support 56, and the base member 12. However, the arrangement of the button 72 is not limited to the above arrangements.

The elastic member 74 is movably mounted to the motor unit 50. The elastic member 74 is movably mounted to the gear structure 54. The elastic member 74 is movably mounted to the gear support 56. However, the arrangement of the elastic member 74 is not limited to the above arrangements.

The button 72 includes the user accessing portion 66. The user accessing portion 66 is configured to be contactable with a user when the electrical user interface 64 is operated by the user. The user accessing portion 66 is configured to be contactable with a user's hand when the electrical user interface 64 is operated by the user.

The button 72 includes a proximal end portion 72A and a distal end portion 72B. The button 72 has a longitudinal center axis A7. The button 72 extend portions between the proximal end portion 72A and the distal end portion 72B along the longitudinal center axis A7. The proximal end portion 72A is closer to the switch circuit 70 than the distal end portion 72B. The user accessing portion 66 is provided at the distal end portion 72B. The user accessing portion 66 has a first diameter DM1. The proximal end portion 72A has a second diameter DM2. The first diameter DM1 is larger than the second diameter DM2. However, the first diameter DM1 can be equal to or smaller than the second diameter DM2 if needed and/or desired.

In the present embodiment, the longitudinal center axis A7 of the button 72 is defined along a reference direction D1. The longitudinal center axis A7 of the button 72 is defined parallel to the reference direction D1. However, the longitudinal center axis A7 of the button 72 can be non-parallel to the reference direction D1.

The base member 12 includes an opening 12C. The motor housing 42 includes an opening 42C. The electrical user interface 64 extends through the openings 12C and 42C. The button 72 extends through the openings 12C and 42C. The button 72 is movably provided in the opening 42C. The button 72 is movably supported by the motor housing 42. The user accessing portion 66 is provided outside of the motor housing 42 and the base member 12 to be contactable with a user's hand.

The elastic member 74 is movably mounted to at least one of the motor housing 42 and the gear structure 54. The elastic member 74 is movably mounted to at least one of the motor housing 42 and the gear support 56. The at least one of the motor housing 42 and the gear support 56 includes a support hole 56A. The elastic member 74 is movably provided in the support hole 56A. The proximal end portion 72A of the button 72 is movably provided in the support hole 56A. In the present embodiment, the gear support 56 includes the support hole 56A. However, at least one of the motor housing 42 and the gear support 56 can include the support hole 56A.

The switch circuit 70 includes a first contact 70A and a second contact 70B. The first contact 70A is electrically mounted on the circuit board 62. The second contact 70B is configured to be contactable with the first contact 70A in response to force applied from the button 72 to the second contact 70B. The second contact 70B is configured to be spaced apart from the first contact 70A when no force is applied from the button 72. Namely, the switch circuit 70 is a normally open switch circuit. The elastic member 74 is at least partly provided between the second contact 70B and the button 72. The force is applied from the button 72 to the second contact 70B through the elastic member 74.

The switch circuit 70 is made of a first material. The button 72 is made of a second material. The elastic member 74 is made of a third material. The third material is softer than at least one of the first material and the second material. In the present embodiment, the first material is different from the second material and the third material. The second material is different from the third material. However, the first material can be the same as at least one of the second material and the third material. The second material can be the same as the third material.

The first material includes a metallic material. The second material includes a metallic material. The third material includes a non-metallic material. In the present embodiment, for example, the first material includes copper or copper alloy. The second material includes aluminum. The third material includes an elastomer. However, the first material can include non-metallic material. The second material can include non-metallic material such as a resin material. The third material can include a metallic material. The third material can include a spring made of a metallic material.

A minimum spacing distance MD defined between the circuit board 62 and a distal end portion of the electrical user interface 64 is equal to larger than 5 mm. The minimum spacing distance MD is defined between the circuit board 62 and the distal end portion of the electrical user interface 64 in a rest state where the electrical user interface 64 is not operated by the user. In the present embodiment, the minimum spacing distance MD is equal to or larger than 8 mm.

The minimum spacing distance MD is equal to or larger than 10 mm. The minimum spacing distance MD is equal to or larger than 13 mm. The minimum spacing distance MD is equal to or larger than 15 mm. The minimum spacing distance MD is equal to smaller than 18.5 mm. However, the minimum spacing distance MD is not limited to the above ranges.

The informing unit 68 includes a light emitter 68A and a light transmission member 68B. The light emitter 68A is configured to emit light. The light emitter 68A is configured to be electrically connected to the circuit board 62. The light transmission member 68B is configured to transmit light emitted from the light emitter 68A. The light transmission member 68B is made of a transparent material. The motor housing 42 includes a hole 42D. The base member 12 includes a hole 12D. The light transmission member 68B is partly provided in the holes 42D and 12D to conduct light from the motor accommodating space 58 to the outside of the bicycle derailleur 10.

Figure 8:
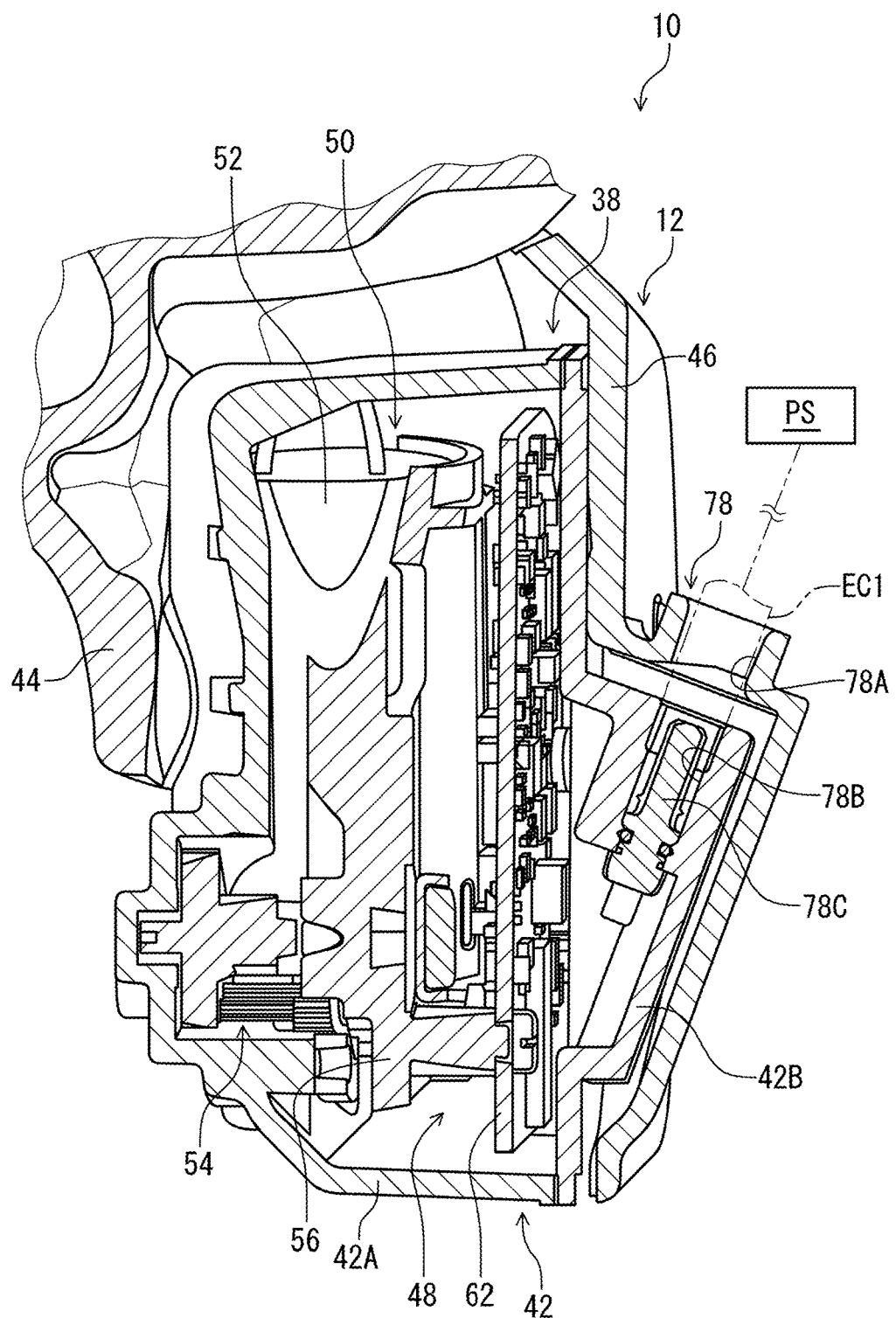
FIG. 8 is a cross-sectional view of the bicycle derailleur along line VIII-VIII of FIG. 3.

As seen in FIG. 8, the bicycle derailleur 10 further comprises an electric port 78. The electric port 78 is configured to be electrically connected to the circuit board 62. The electric port 78 is configured to be electrically connected to an electric power source PS. The electric port 78 is configured to be electrically connected to an electric cable EC1 and is provided to at least one of the base member 12 and the motor housing 42. The electric port 78 is configured to receive electric power through the electric cable EC1. The electric port 78 is configured to receive electric power from the electric power source PS through the electric cable EC1. The electric port 78 is configured to transmit electric power to the electric power source PS through the electric cable EC1. The electric power source PS is configured to supply electric power to the circuit board 62, the motor unit 50, and the informing unit 68 through the electric port 78. The electric power source PS is electrically connected to the circuit board 62. The electric power source PS includes a secondary battery configured to be recharged. The electric power source PS is mounted on the bicycle frame 2A (see, e.g. FIG. 1). For example, the electric power source PS is mounted on a seat tube of the bicycle frame 2A. However, the electric power source PS can be a mounted on the bicycle derailleur 10.

In the present embodiment, the electric port 78 is provided to the base member 12 and the motor housing 42. The electric port 78 includes a first hole 78A, a second hole 78B, and an electric connector 78C. The first hole 78A is provided to the base member 12. The second hole 78B is provided to the motor housing 42. The electric connector 78C is provided in the second hole 78B. The electric connector 78C is configured to be electrically connected to the circuit board 62.

Figure 9:
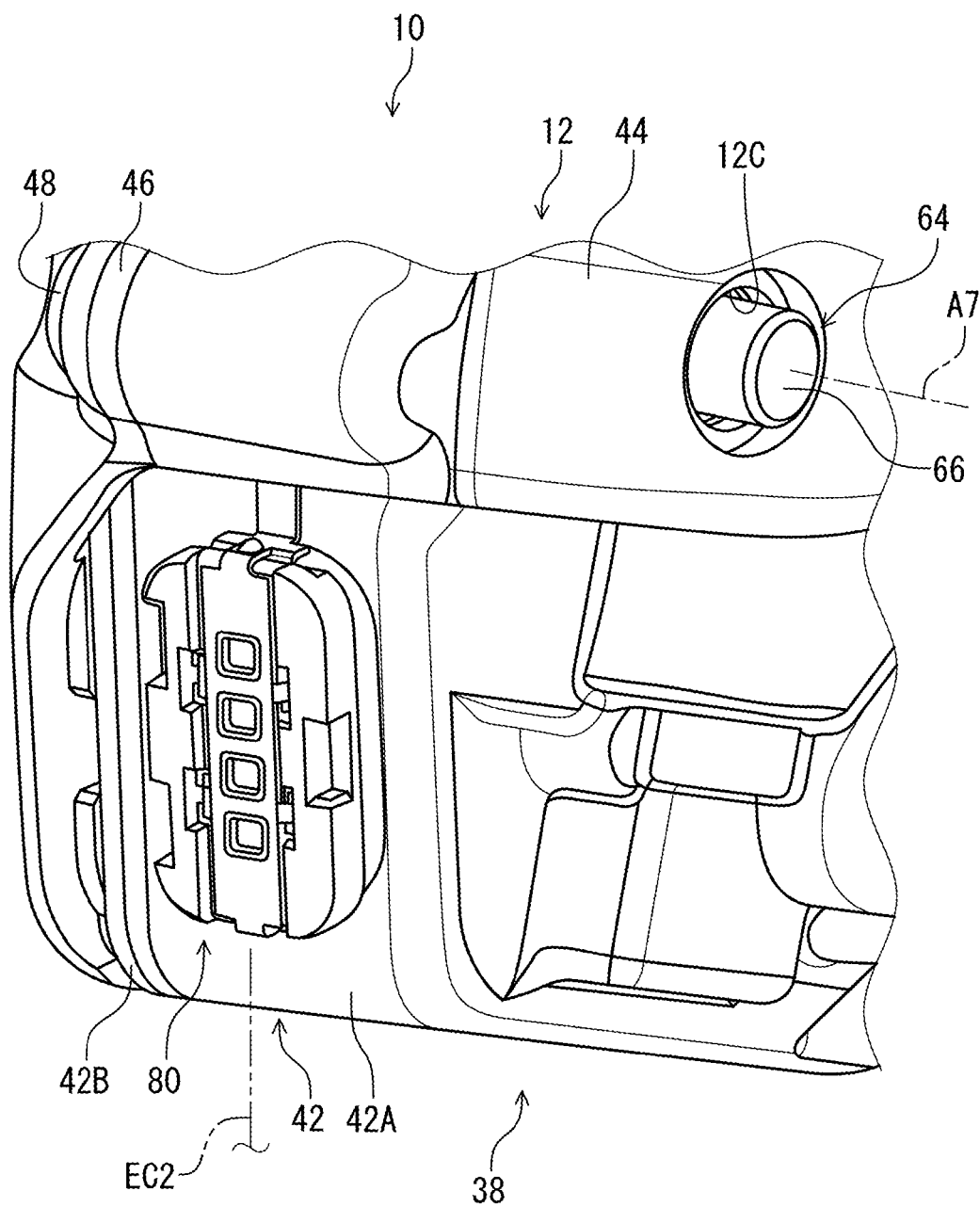
FIG. 9 is a perspective view of the bicycle derailleur illustrated in FIG. 1, with a cover omitted.

As seen in FIG. 9, the bicycle derailleur 10 further comprises an electric port 80. The electric port 80 is configured to be electrically connected to the circuit board 62 (see, e.g., FIG. 8). The electric port 80 is configured to be electrically connected to an electric cable EC2 and is provided to at least one of the base member 12 and the motor housing 42. The electric port 80 is configured to receive electric power through the electric cable EC2. The electric port 80 is configured to receive charging power through the electric cable EC2. The electric port 80 is configured to receive charging power from an eternal power source other than the electric power source PS through the electric cable EC2. The electric power source PS is configured to be recharged using charging power received by the electric port 80.

In the present embodiment, the electric port 80 is provided to the motor housing 42. The electric port 80 is provided to the motor housing 42 to be exposed from the motor housing 42. As seen in FIG. 3, the bicycle derailleur 10 comprises a cover 82. The cover 82 is configured to be detachably attached to the motor housing 42. The cover 82 is detachable from the motor housing 42 without substantial damage and attachable to the motor housing 42 again. The cover 82 covers the electric port 80 in a state where the cover 82 is attached to the motor housing 42.

Figure 10:
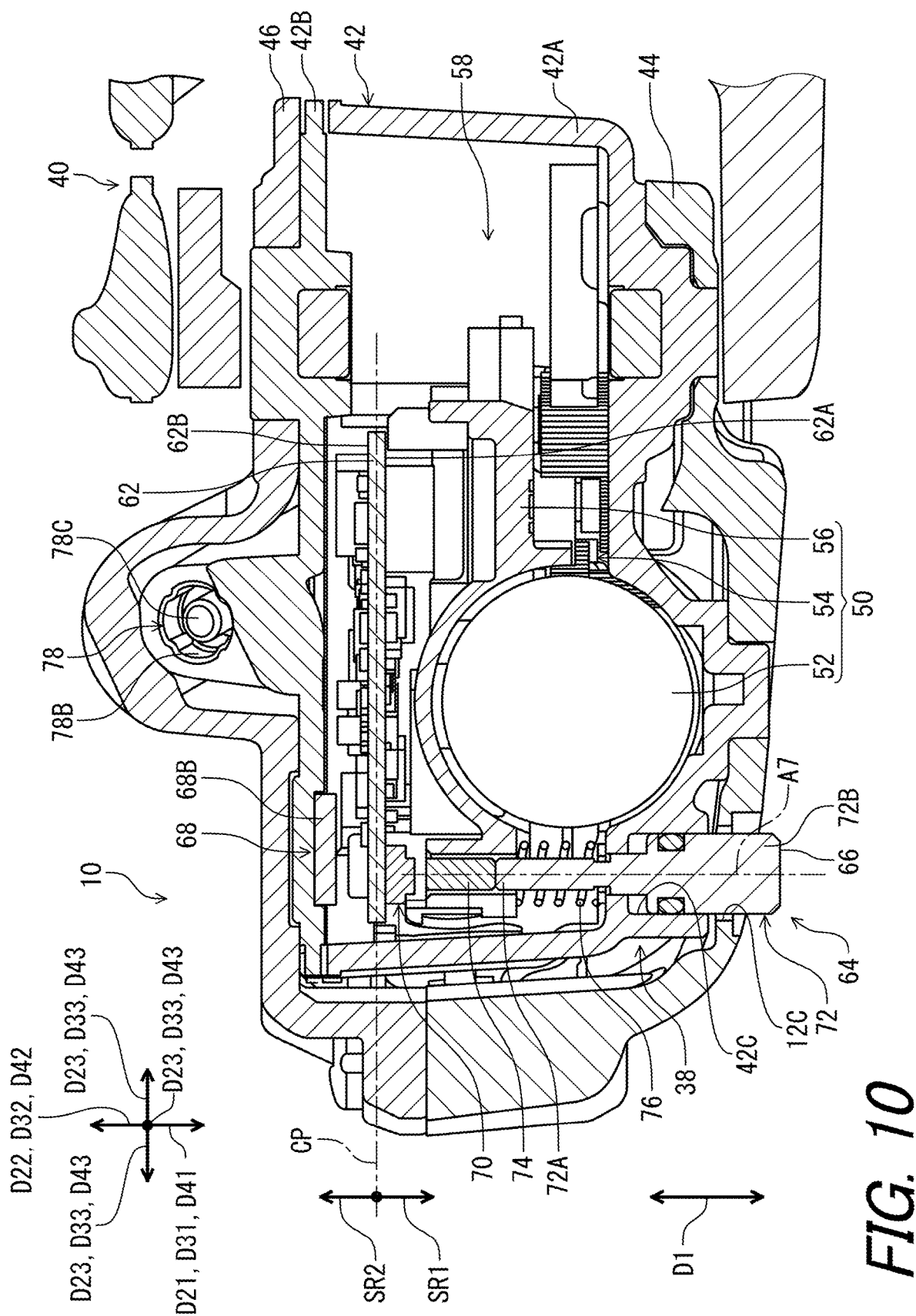
FIG. 10 is a cross-sectional view of the bicycle derailleur along line X-X of FIG. 4.

As seen in FIGS. 7 and 10, the circuit board 62 has a center plane CP that bisects a thickness of the circuit board 62. The circuit board 62 includes a first surface 62A and a second surface 62B. The second surface 62B is provided on a reverse side of the first surface 62A. The thickness of the circuit board 62 is defined between the first surface 62A and the second surface 62B in the reference direction D1 perpendicular to the center plane CP of the circuit board 62.

The center plane CP of the circuit board 62 defines a first spatial region SR1 and a second spatial region SR2. The center plane CP of the circuit board 62 is provided between the first spatial region SR1 and the second spatial region SR2. The second spatial region SR2 is opposite to the first spatial region SR1 with respect to the center plane CP of the circuit board 62.

The electrical user interface 64 is disposed in the first spatial region SR1 with respect to the center plane CP of the circuit board 62. The motor unit 50 is disposed in the first spatial region SR1 with respect to the center plane CP of the circuit board 62. The informing unit 68 is disposed in a second spatial region SR2 opposite to the first spatial region SR1 with respect to the center plane CP of the circuit board 62. However, the electrical user interface 64 can be disposed in the second spatial region SR2 with respect to the center plane CP of the circuit board 62. The motor unit 50 can be disposed in the second spatial region SR2 with respect to the center plane CP of the circuit board 62. The informing unit 68 can be disposed in the first spatial region SR1 with respect to the center plane CP of the circuit board 62.

The circuit board 62 is at least partly provided between the user accessing portion 66 of the electrical user interface 64 and the informing unit 68 in the reference direction D1 perpendicular to the center plane CP of the circuit board 62. The circuit board 62 is at least partly provided between the motor unit 50 and the informing unit 68 in the reference direction D1 perpendicular to the center plane CP of the circuit board 62.

In the present embodiment, the circuit board 62 is entirely provided between the user accessing portion 66 of the electrical user interface 64 and the informing unit 68 in the reference direction D1. The circuit board 62 is entirely provided between the motor unit 50 and the informing unit 68 in the reference direction D1. However, the circuit board 62 can be partly provided between the user accessing portion 66 of the electrical user interface 64 and the informing unit 68 in the reference direction D1 if needed and/or desired. The circuit board 62 can be partly provided between the motor unit 50 and the informing unit 68 in the reference direction D1 if needed and/or desired.

The circuit board 62 is at least partly provided in a maximum region MR1 defined between the user accessing portion 66 of the electrical user interface 64 and the informing unit 68 in the reference direction D1. The maximum region MR1 is defined between a farthest part of the user accessing portion 66 from the circuit board 62 and a farthest part of the informing unit 68 from the circuit board 62 in the reference direction D1. The circuit board 62 is at least partly provided in a maximum region MR2 defined between the motor unit 50 and the informing unit 68 in the reference direction D1. The maximum region MR2 is defined between a farthest part of the motor unit 50 from the circuit board 62 and the farthest part of the informing unit 68 from the circuit board 62 in the reference direction D1. In the present embodiment, the circuit board 62 is entirely provided in the maximum region MR1. The circuit board 62 is entirely provided in the maximum region MR2. However, the circuit board 62 can be partly provided in the maximum region MR1. The circuit board 62 can be partly provided in the maximum region MR2.

The motor unit 50 is at least partly provided between the user accessing portion 66 of the electrical user interface 64 and the circuit board 62 in the reference direction D1 perpendicular to the center plane CP of the circuit board 62. The motor unit 50 is at least partly provided between the user accessing portion 66 of the electrical user interface 64 and the informing unit 68 in the reference direction D1.

In the present embodiment, the motor unit 50 is partly provided between the user accessing portion 66 of the electrical user interface 64 and the circuit board 62 in the reference direction D1 perpendicular to the center plane CP of the circuit board 62. The motor unit 50 is partly provided between the user accessing portion 66 of the electrical user interface 64 and the informing unit 68 in the reference direction D1. However, the motor unit 50 can be entirely provided between the user accessing portion 66 of the electrical user interface 64 and the circuit board 62 in the reference direction D1 if needed and/or desired. The motor unit 50 can be entirely provided between the user accessing portion 66 of the electrical user interface 64 and the informing unit 68 in the reference direction D1 if needed and/or desired.

The motor unit 50 is at least partly provided in a maximum region MR3 defined between the user accessing portion 66 of the electrical user interface 64 and the circuit board 62 in the reference direction D1. The maximum region MR3 is defined between a farthest part of the user accessing portion 66 from the motor unit 50 and a farthest part of the circuit board 62 from the motor unit 50 in the reference direction D1. The motor unit 50 is at least partly provided in a maximum region MR4 defined between the user accessing portion 66 of the electrical user interface 64 and the informing unit 68 in the reference direction D1. The maximum region MR4 is defined between a farthest part of the user accessing portion 66 from the motor unit 50 and a farthest part of the informing unit 68 from the motor unit 50 in the reference direction D1. The maximum region MR4 is the same as the maximum region MR1. In the present embodiment, the motor unit 50 is entirely provided in the maximum region MR3. The motor unit 50 is entirely provided in the maximum region MR4. However, the motor unit 50 can be partly provided in the maximum region MR3. The motor unit 50 can be partly provided in the maximum region MR4.

The gear structure 54 is at least partly provided between the user accessing portion 66 of the electrical user interface 64 and the circuit board 62 in the reference direction D1. The gear support 56 is at least partly provided between the user accessing portion 66 of the electrical user interface 64 and the circuit board 62 in the reference direction D1. The gear support 56 is at least partly provided between the motor 52 and the circuit board 62 in the reference direction D1.

In the present embodiment, the gear structure 54 is partly provided between the user accessing portion 66 of the electrical user interface 64 and the circuit board 62 in the reference direction D1. The gear support 56 is partly provided between the user accessing portion 66 of the electrical user interface 64 and the circuit board 62 in the reference direction D1. The gear support 56 is partly provided between the motor 52 and the circuit board 62 in the reference direction D1. However, the gear structure 54 can be entirely provided between the user accessing portion 66 of the electrical user interface 64 and the circuit board 62 in the reference direction D1 if needed and/or desired. The gear support 56 can be entirely provided between the user accessing portion 66 of the electrical user interface 64 and the circuit board 62 in the reference direction D1 if needed and/or desired. The gear support 56 can be entirely provided between the motor 52 and the circuit board 62 in the reference direction D1 if needed and/or desired.

The gear structure 54 is at least partly provided in a maximum region MR5 defined between the user accessing portion 66 of the electrical user interface 64 and the circuit board 62 in the reference direction D1. The maximum region MR5 is defined between a farthest part of the user accessing portion 66 from the gear structure 54 and a farthest part of the circuit board 62 from the gear structure 54 in the reference direction D1. The maximum region MR5 is the same as the maximum region MR3. The gear support 56 is at least partly provided in a maximum region MR6 defined between the user accessing portion 66 and the circuit board 62 in the reference direction D1. The maximum region MR6 is defined between a farthest part of the user accessing portion 66 from the gear support 56 and a farthest part of the circuit board 62 from the gear support 56 in the reference direction D1. The maximum region MR6 is the same as the maximum region MR3. The gear support 56 is at least partly provided in a maximum region MR7 defined between the motor 52 and the circuit board 62 in the reference direction D1. The maximum region MR7 is defined between a farthest part of the motor 52 from the gear support 56 and a farthest part of the circuit board 62 from the gear support 56 in the reference direction D1.

In the present embodiment, the gear structure 54 is entirely provided in the maximum region MR5. The gear support 56 is entirely provided in a maximum region MR6. The gear support 56 is entirely provided in the maximum region MR7. However, the gear structure 54 can be partly provided in the maximum region MR5. The gear support 56 can be partly provided in a maximum region MR6. The gear support 56 can be partly provided in the maximum region MR7.

Figure 11:
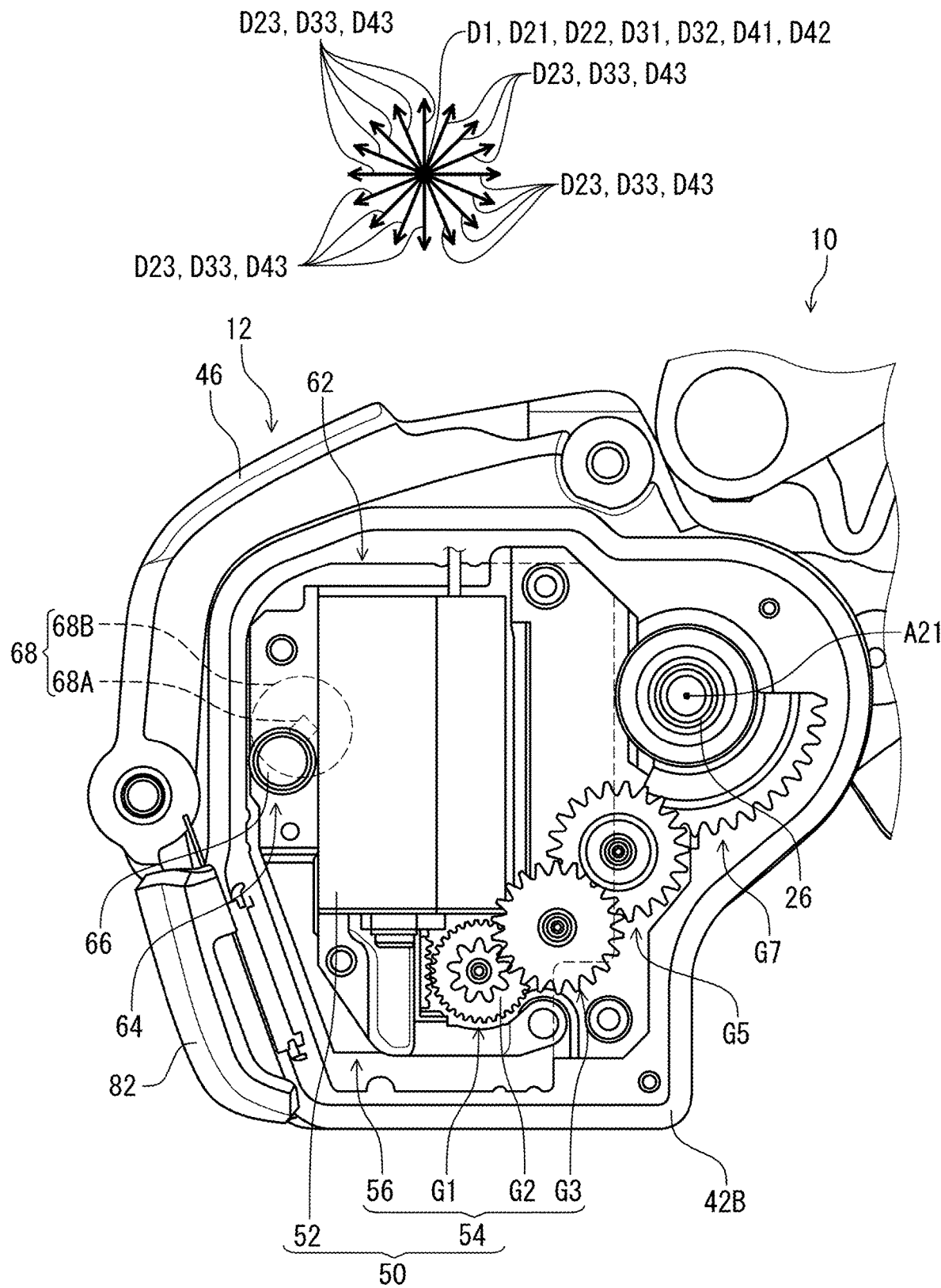
FIG. 11 is a side elevational view of the bicycle derailleur illustrated in FIG. 1, with the base member and the motor housing partly omitted.

As seen in FIG. 11, at least two of the motor unit 50, the circuit board 62, the electrical user interface 64, and the informing unit 68 are arranged to at least partly overlap with each other when viewed in the reference direction D1. In the present embodiment, the circuit board 62 is arranged to partly overlap with the motor unit 50, the electrical user interface 64, and the informing unit 68 when viewed in the reference direction D1. The motor unit 50 is arranged to partly overlap with the circuit board 62, the electrical user interface 64, and the informing unit 68 when viewed in the reference direction D1. The electrical user interface 64 is arranged to partly overlap with the motor unit 50, the circuit board 62, and the informing unit 68 when viewed in the reference direction D1. The informing unit 68 is arranged to partly overlap with the motor unit 50, the circuit board 62, and the electrical user interface 64 when viewed in the reference direction D1.

However, the circuit board 62 can be arranged to at least partly overlap with at least one of the motor unit 50, the electrical user interface 64, and the informing unit 68 when viewed in the reference direction D1. The motor unit 50 can be arranged to at least partly overlap with at least one of the circuit board 62, the electrical user interface 64, and the informing unit 68 when viewed in the reference direction D1. The electrical user interface 64 can be arranged to at least partly overlap with at least one of the motor unit 50, the circuit board 62, and the informing unit 68 when viewed in the reference direction D1. The informing unit 68 can be arranged to at least partly overlap with at least one of the motor unit 50, the circuit board 62, and the electrical user interface 64 when viewed in the reference direction D1.

As seen in FIGS. 7 and 10, a first direction D21 or D22 is defined from the circuit board 62 toward the electrical user interface 64 or from the electrical user interface 64 toward the circuit board 62. The first direction D21 or D22 is defined from the circuit board 62 toward the user accessing portion 66 of the electrical user interface 64 or from the user accessing portion 66 of the electrical user interface 64 toward the circuit board 62. A first direction D31 or D32 is defined from the informing unit 68 toward the user accessing portion 66 of the electrical user interface 64 or from the user accessing portion 66 of the electrical user interface 64 toward the informing unit 68. A first direction D41 or D42 is defined from the informing unit 68 toward the circuit board 62 or from the circuit board 62 toward the informing unit 68. In the present embodiment, the first directions D21, D22, D31, D32, D41, and D42 are defined parallel to the reference direction D1. However, at least one of the first directions D21, D22, D31, D32, D41, and D42 can be non-parallel to the reference direction D1.

As seen in FIG. 11, a plurality of second directions D23 is defined to be perpendicular to the first direction D21 or D22. The plurality of second directions D23 is different from each other. The plurality of second directions D23 includes all directions radially extending with respect to the first direction D21 or D22. A plurality of second directions D33 is defined to be perpendicular to the first direction D31 or D32. The plurality of second directions D33 is different from each other. The plurality of second directions D33 includes all directions radially extending with respect to the first direction D31 or D32. A plurality of second directions D43 is defined to be perpendicular to the first direction D41 or D42. The plurality of second directions D43 is different from each other. The plurality of second directions D43 includes all directions radially extending with respect to the first direction D41 or D42.

As seen in FIGS. 7 and 10, the circuit board 62 is at least partly provided between the user accessing portion 66 of the electrical user interface 64 and the informing unit 68 when viewed in at least one of the plurality of second directions D23. The circuit board 62 is at least partly provided between the user accessing portion 66 of the electrical user interface 64 and the informing unit 68 when viewed in at least one of the plurality of second directions D33. The circuit board 62 is at least partly provided between the motor unit 50 and the informing unit 68 when viewed in at least one of the plurality of second directions D23. The circuit board 62 is at least partly provided between the motor unit 50 and the informing unit 68 when viewed in at least one of the plurality of second directions D33.

In the present embodiment, the circuit board 62 is entirely provided between the user accessing portion 66 of the electrical user interface 64 and the informing unit 68 when viewed in at least one of the plurality of second directions D23. The circuit board 62 is entirely provided between the user accessing portion 66 of the electrical user interface 64 and the informing unit 68 when viewed in at least one of the plurality of second directions D33. The circuit board 62 is entirely provided between the motor unit 50 and the informing unit 68 when viewed in at least one of the plurality of second directions D23. The circuit board 62 is entirely provided between the motor unit 50 and the informing unit 68 when viewed in at least one of the plurality of second directions D33. However, the circuit board 62 can be partly provided between the user accessing portion 66 of the electrical user interface 64 and the informing unit 68 when viewed in at least one of the plurality of second directions D23 if needed and/or desired. The circuit board 62 can be partly provided between the user accessing portion 66 of the electrical user interface 64 and the informing unit 68 when viewed in at least one of the plurality of second directions D33 if needed and/or desired. The circuit board 62 can be partly provided between the motor unit 50 and the informing unit 68 when viewed in at least one of the plurality of second directions D23 if needed and/or desired. The circuit board 62 can be partly provided between the motor unit 50 and the informing unit 68 when viewed in at least one of the plurality of second directions D33 if needed and/or desired.

The motor unit 50 is at least partly provided between the user accessing portion 66 of the electrical user interface 64 and the circuit board 62 when viewed in at least one of the plurality of second directions D23. The motor unit 50 is at least partly provided between the user accessing portion 66 of the electrical user interface 64 and the informing unit 68 when viewed in at least one of the plurality of second directions D23. The motor unit 50 is at least partly provided between the informing unit 68 and the circuit board 62 when viewed in at least one of the plurality of second directions D23.

In the present embodiment, the motor unit 50 is partly provided between the user accessing portion 66 of the electrical user interface 64 and the circuit board 62 when viewed in at least one of the plurality of second directions D23. The motor unit 50 is partly provided between the user accessing portion 66 of the electrical user interface 64 and the informing unit 68 when viewed in at least one of the plurality of second directions D23. The motor unit 50 is partly provided between the informing unit 68 and the circuit board 62 when viewed in at least one of the plurality of second directions D23. However, the motor unit 50 can be entirely provided between the user accessing portion 66 of the electrical user interface 64 and the circuit board 62 when viewed in at least one of the plurality of second directions D23 if needed and/or desired. The motor unit 50 can be entirely provided between the user accessing portion 66 of the electrical user interface 64 and the informing unit 68 when viewed in at least one of the plurality of second directions D23 if needed and/or desired. The motor unit 50 can be entirely provided between the informing unit 68 and the circuit board 62 when viewed in at least one of the plurality of second directions D23 if needed and/or desired.

The gear structure 54 is at least partly provided between the user accessing portion 66 of the electrical user interface 64 and the circuit board 62 when viewed in at least one of the plurality of second directions D23. The gear support 56 is at least partly provided between the user accessing portion 66 of the electrical user interface 64 and the circuit board 62 when viewed in at least one of the plurality of second directions D23. The gear support 56 is at least partly provided between the motor 52 and the circuit board 62 when viewed in at least one of the plurality of second directions D23.

In the present embodiment, the gear structure 54 is partly provided between the user accessing portion 66 of the electrical user interface 64 and the circuit board 62 when viewed in at least one of the plurality of second directions D23. The gear support 56 is partly provided between the user accessing portion 66 of the electrical user interface 64 and the circuit board 62 when viewed in at least one of the plurality of second directions D23. The gear support 56 is partly provided between the motor 52 and the circuit board 62 when viewed in at least one of the plurality of second directions D23. However, the gear structure 54 can be entirely provided between the user accessing portion 66 of the electrical user interface 64 and the circuit board 62 when viewed in at least one of the plurality of second directions D23 if needed and/or desired. The gear support 56 can be entirely provided between the user accessing portion 66 of the electrical user interface 64 and the circuit board 62 when viewed in at least one of the plurality of second directions D23 if needed and/or desired. The gear support 56 can be entirely provided between the motor 52 and the circuit board 62 when viewed in at least one of the plurality of second directions D23 if needed and/or desired.

As seen in FIGS. 1 and 2, the guide member 36 of the chain guide 30 includes a first guide member 36A and a second guide member 36B. The first guide member 36A is coupled to the second guide member 36B. The guide pulley 32 and the tension pulley 34 are provided between the first guide member 36A and the second guide member 36B.

Figure 12:
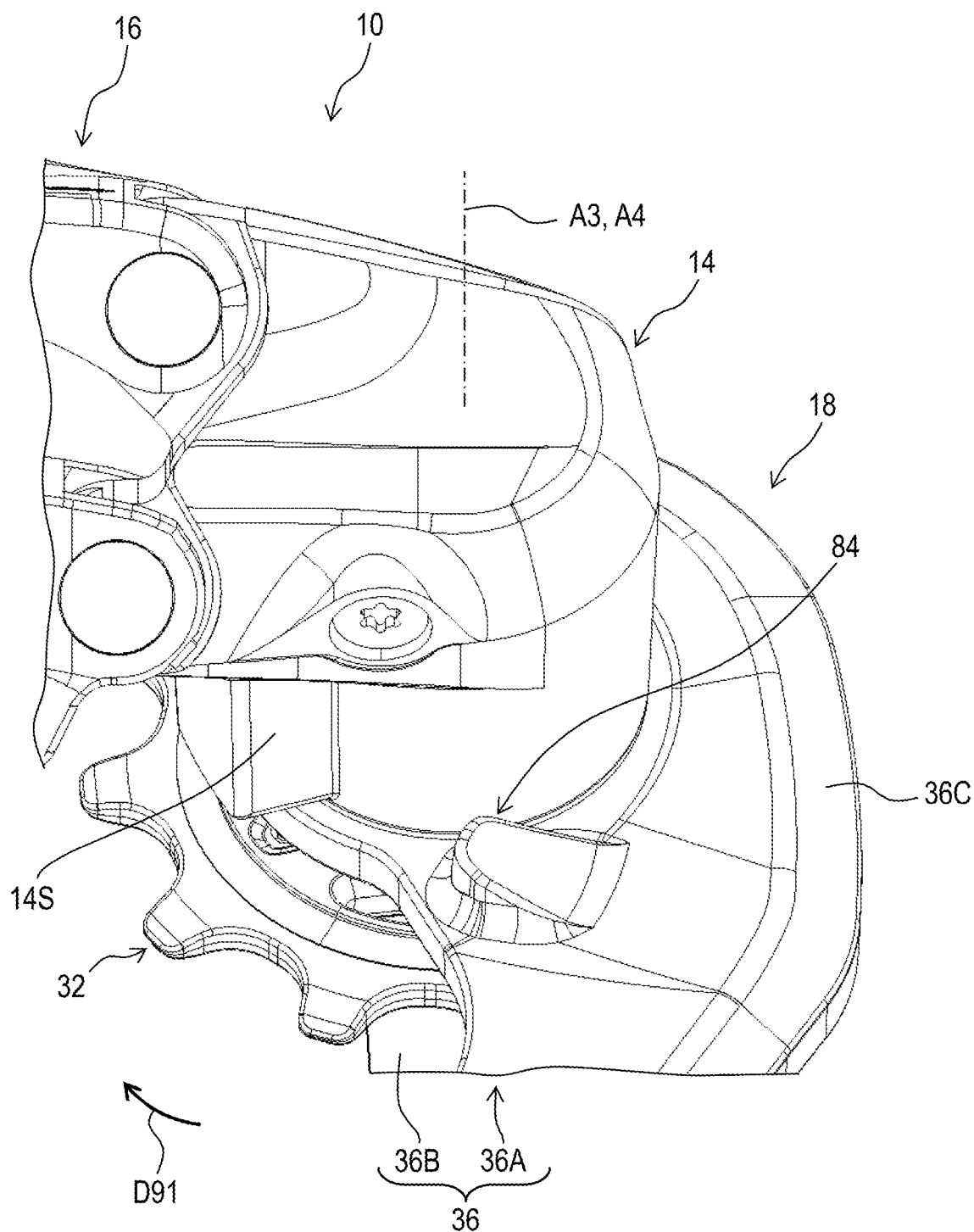
FIG. 12 is a perspective view of the bicycle derailleur illustrated in FIG. 1.

As seen in FIG. 12, the chain guide 30 includes a projection 84. The projection 84 is provided on the guide member 36. The projection 84 protrudes from the guide member 36. The projection 84 is provided on the first guide member 36A. The projection 84 protrudes from the first guide member 36A away from the second guide member 36B.

The projection 84 is configured to contact the movable member 14 to restrict the chain guide 30 from pivoting relative to the movable member 14 in a first pivot direction D91. The movable member 14 includes a stopper 14S. The projection 84 is configured to contact the stopper 14S of the movable member 14 to restrict the chain guide 30 from pivoting relative to the movable member 14 about the chain-guide axis A3 in a first pivot direction D91.

Figure 13:
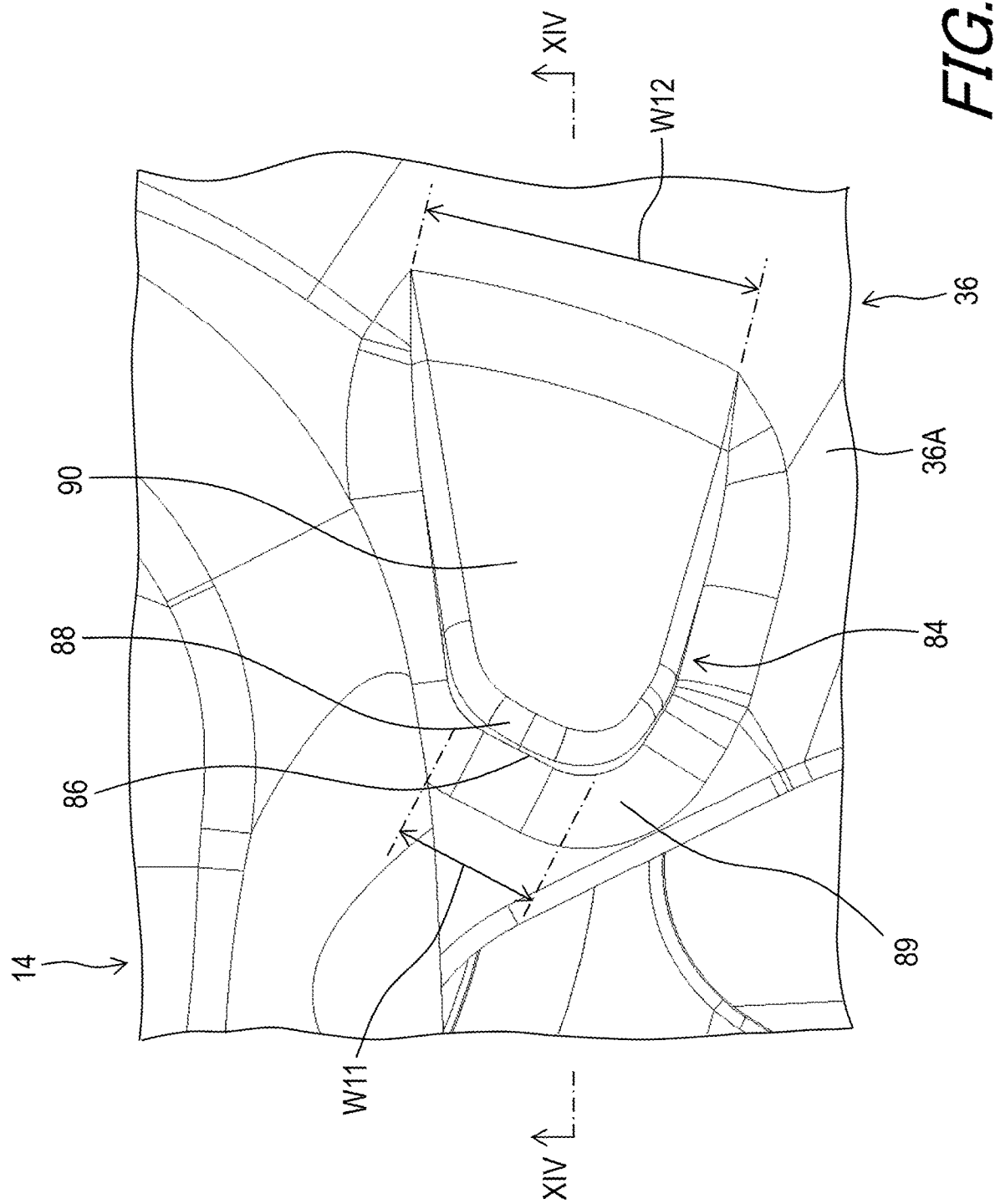
FIG. 13 is an enlarged side elevational view of the bicycle derailleur illustrated in FIG. 1.

As seen in FIG. 13, the projection 84 includes a contact surface 86. The contact surface 86 is configured to contact the stopper 14S of the movable member 14. The contact surface 86 includes a curved surface when viewed along the chain-guide axis A3.

Figure 14:
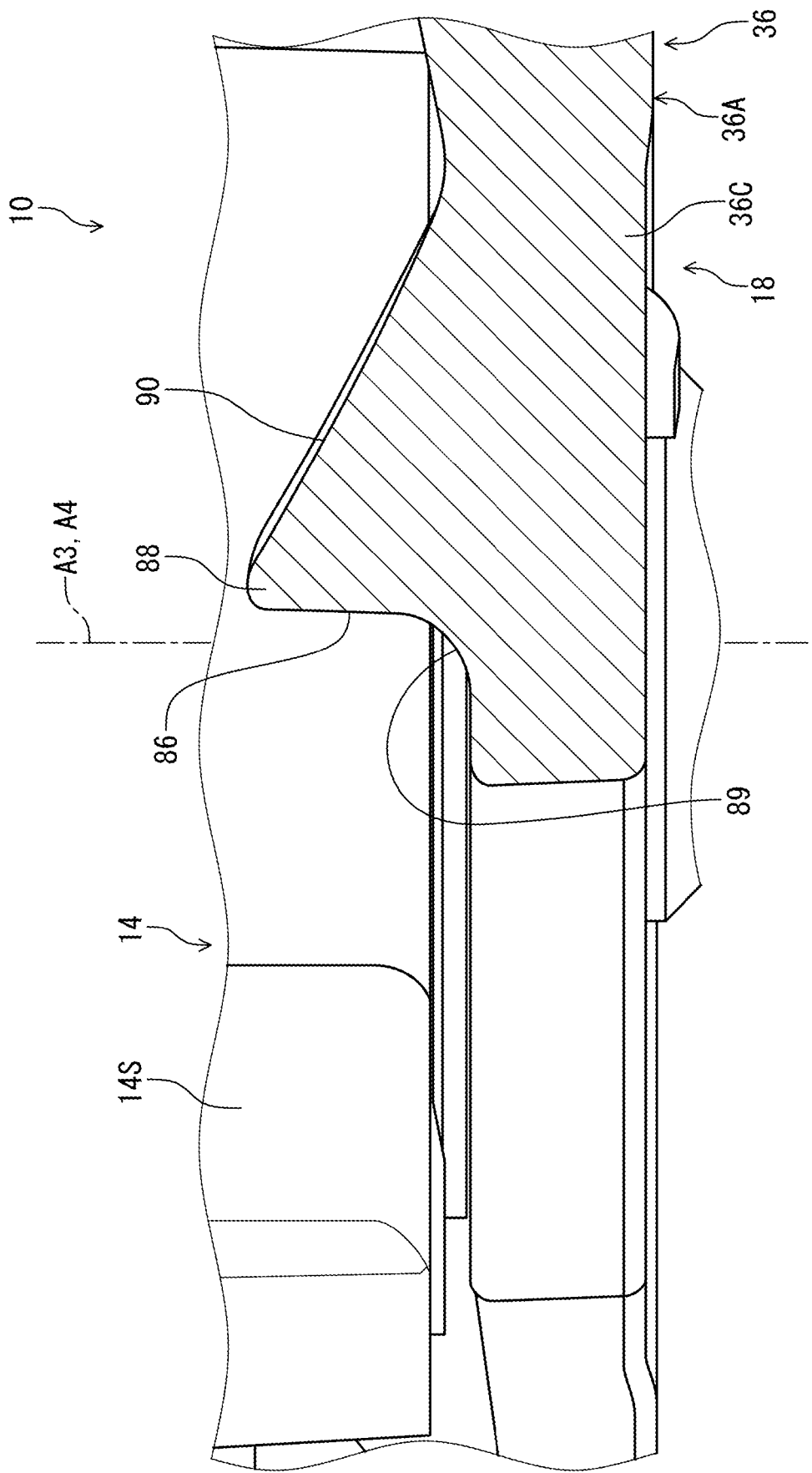
FIG. 14 is a cross-sectional view of the bicycle derailleur along line XIV-XIV of FIG. 13.

As seen in FIG. 14, the projection 84 is integrally provided with the first guide member 36A of the guide member 36 as a one-piece unitary member. However, the projection 84 can be a separate member from the first guide member 36A of the guide member 36.

The contact surface 86 includes a flat surface extending along the chain-guide axis A3. The projection 84 includes a projection end 88, a curved surface 89, and an inclined surface 90. The contact surface 86 is at least partly provided between the projection end 88 and the guide member 36. The contact surface 86 extends from the projection end 88 toward the guide member 36. The curved surface 89 is at least partly provided between the contact surface 86 and the guide member 36. The curved surface 89 extends from the contact surface 86 to the guide member 36. The inclined surface 90 is inclined relative to the contact surface 86. The inclined surface 90 is at least partly provided between the projection end 88 and the guide member 36. The inclined surface 90 extends from the projection end 88 toward the guide member 36.

As seen in FIG. 13, the contact surface 86 has a first width W11. The inclined surface 90 has a second width W12. The second width W12 is larger than the first width W11. The curved surface 89 at least partly surrounds the contact surface 86 and the inclined surface 90 when viewed along the chain-guide axis A3. The shape of the projection 84 is not limited to the shape illustrated in FIGS. 12 to 14.

Figure 15:
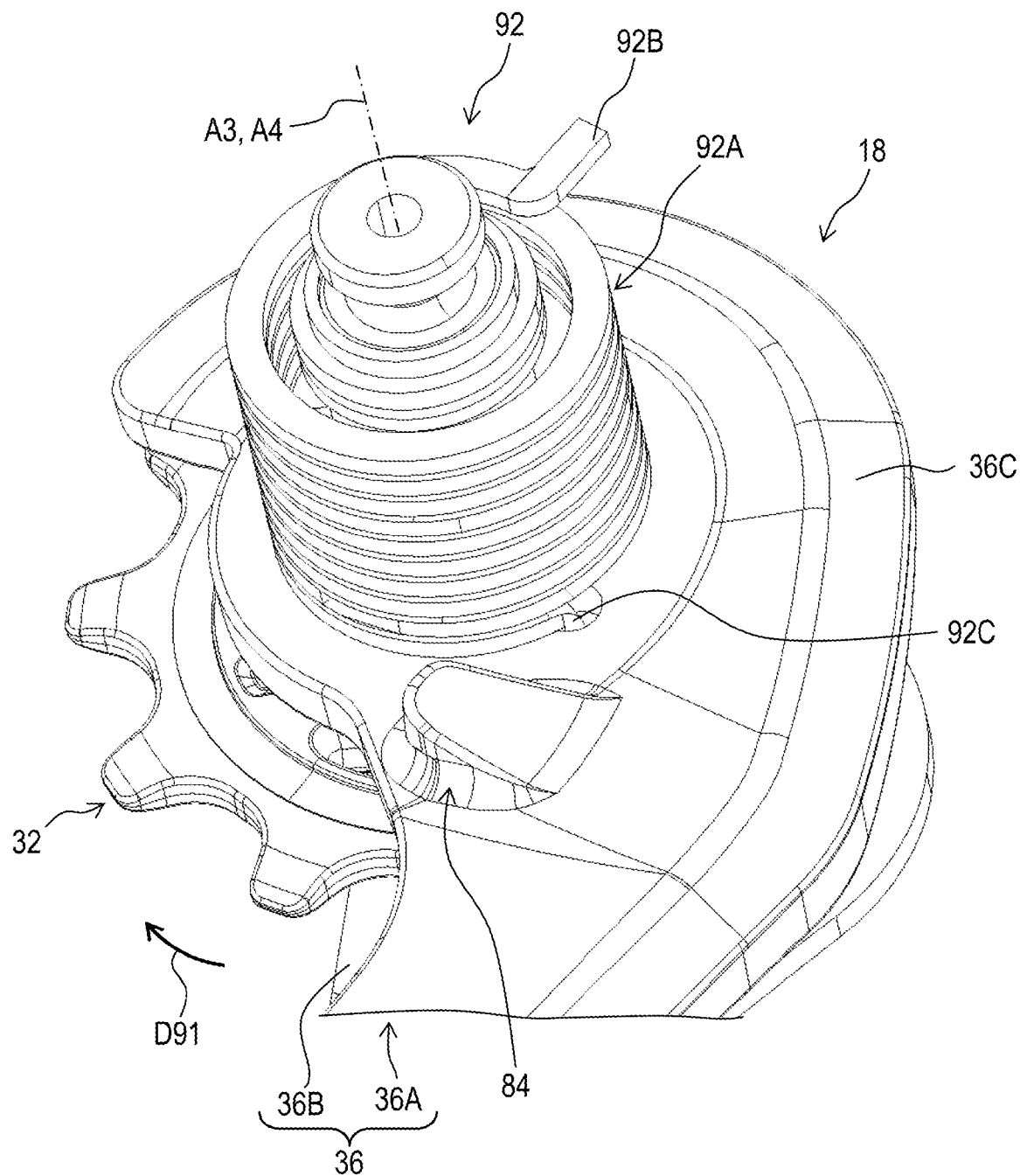
FIG. 15 is a perspective view of the bicycle derailleur illustrated in FIG. 1, with a movable member omitted.

As seen in FIG. 15, the bicycle derailleur 10 includes a chain-guide biasing member 92. The chain-guide biasing member 92 is configured to bias the chain guide 30 relative to the movable member 14 (see, e.g., FIG. 12) in the first pivot direction D91. The chain-guide biasing member 92 includes a coiled body 92A, a first end 92B, and a second end 92C. The coiled body 92A couples the first end 92B to the second end 92C. The first end 92B is engaged with the movable member 14. The second end 92C is engaged with the chain guide 30. The second end 92C is engaged with the first guide member 36A of the guide member 36.

Figure 16:
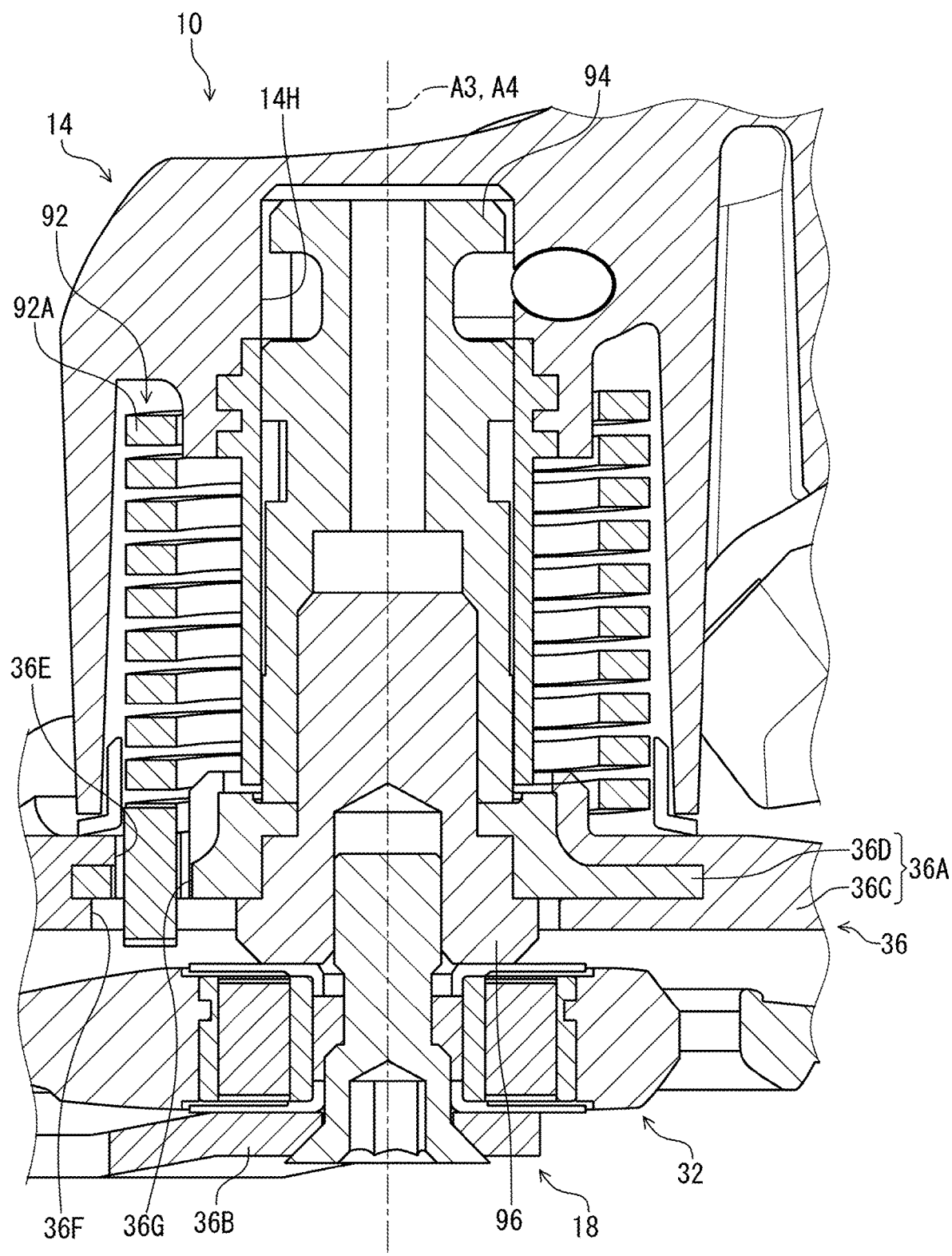
FIG. 16 is a cross-sectional view of the bicycle derailleur illustrated in FIG. 1.

As seen in FIG. 16, the first guide member 36A includes a guide body 36C and a reinforcement body 36D. The reinforcement body 36D is at least partly provided in the guide body 36C. The reinforcement body 36D is at least partly embedded in the guide body 36C. For example, the reinforcement body 36D is at least partly embedded in the guide body 36C with insert molding. However, the reinforcement body 36D can be fastened to the guide body 36C with other structures such as adhesive or fasteners.

The reinforcement body 36D is made of a material different from a material of the guide body 36C. For example, the reinforcement body 36D is made of the material having durability which is higher than durability of the material of the guide body 36C. The reinforcement body 36D is made of the material which is harder than the material of the guide body 36C. For example, the reinforcement body 36D is made of a metallic material. The guide body 36C is made of a non-metallic material. However, the materials of the guide body 36C and the reinforcement body 36D are not limited to the above materials.

The guide body 36C includes a first opening 36E and a second opening 36F. The reinforcement body 36D includes a third opening 36G. The second end 92C of the chain-guide biasing member 92 is provided in the first opening 36E, the second opening 36F, and the third opening 36G.

The bicycle derailleur 10 includes a pivot shaft 94 and a pivot fastener 96. The movable member 14 includes a support hole 14H. The pivot shaft 94 is pivotally provided in the support hole 14H. The pivot fastener 96 is configured to fasten the pivot shaft 94 to the guide member 36. The pivot fastener 96 is configured to fasten the pivot shaft 94 to the first guide member 36A. The pivot fastener 96 is configured to fasten the pivot shaft 94 to the reinforcement body 36D of the first guide member 36A. The pivot shaft 94 and the pivot fastener 96 are configured to contact the reinforcement body 36D. However, the pivot shaft 94 and the pivot fastener 96 are configured not to contact the guide body 36C.

Figure 17:
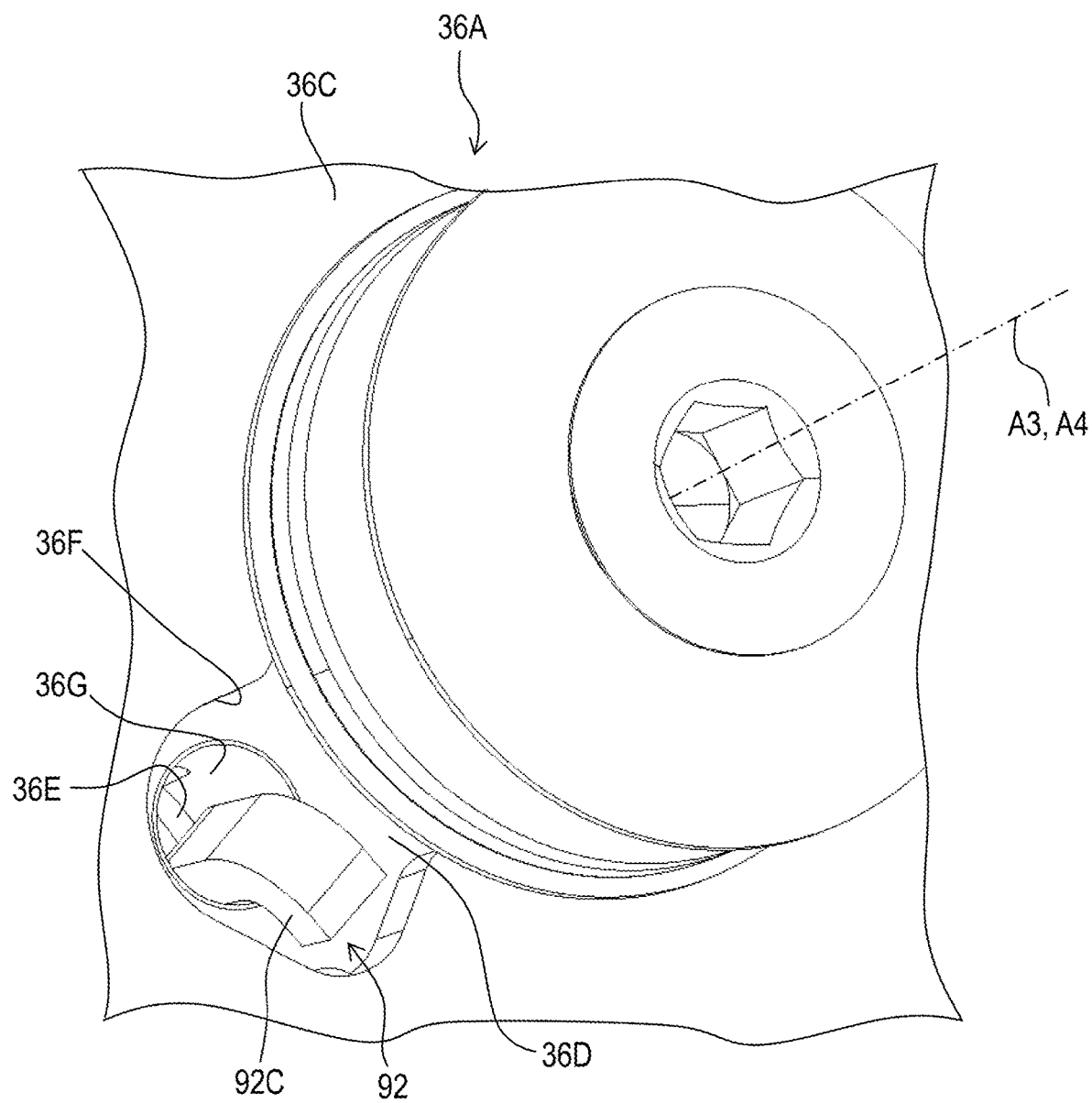
FIG. 17 is a perspective view of the bicycle derailleur illustrated in FIG. 1, with a second guide member omitted.

As seen in FIG. 17, the reinforcement body 36D is in contact with the second end 92C of the chain-guide biasing member 92 to receive biasing force from the chain-guide biasing member 92. The guide body 36C is spaced apart from the second end 92C of the chain-guide biasing member 92 not to receive biasing force from the chain-guide biasing member 92. The reinforcement body 36D is at least partly exposed from the second opening 36F.

Figure 18:
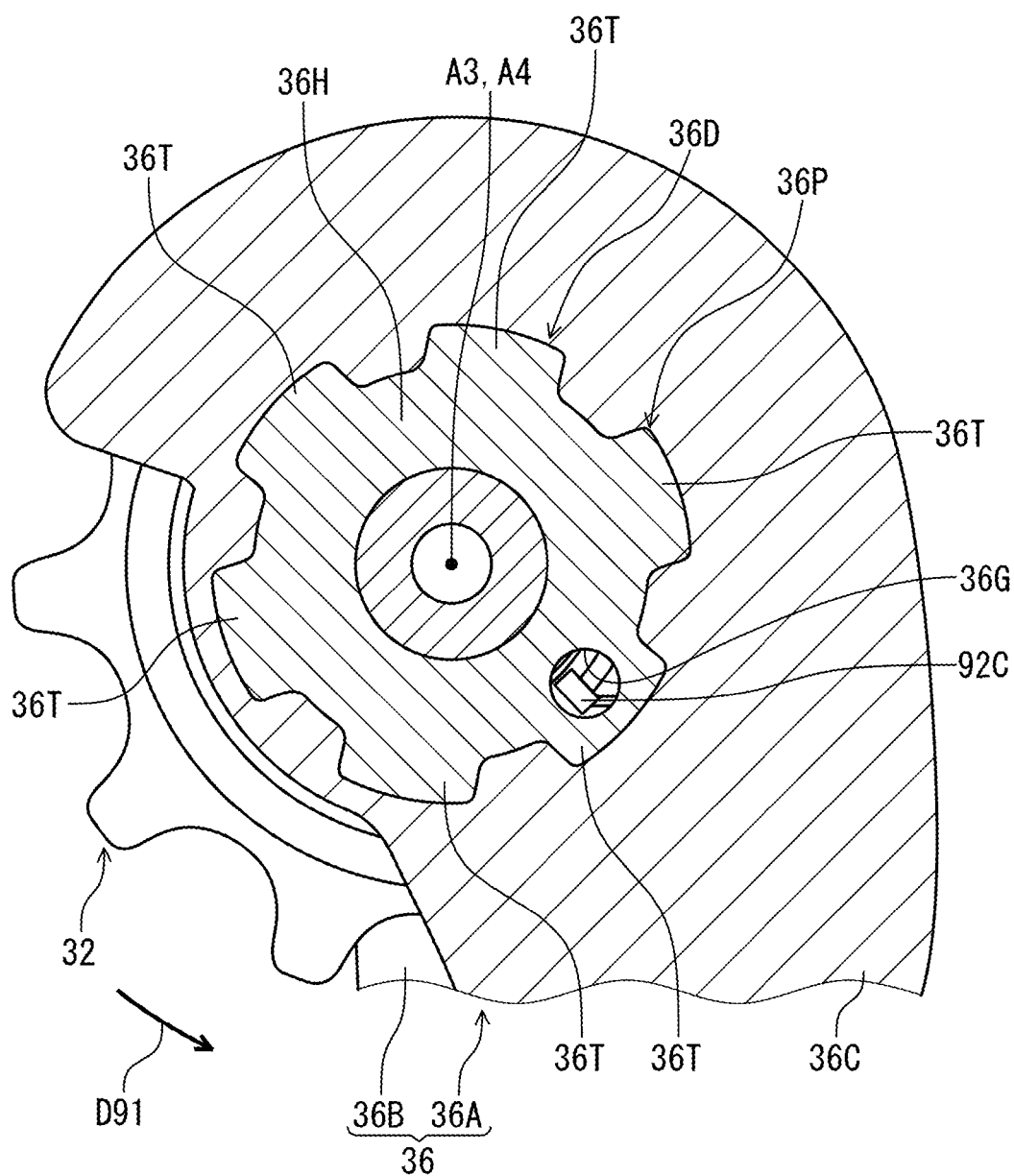
FIG. 18 is a cross-sectional view of the bicycle derailleur illustrated in FIG. 1.

As seen in FIG. 18, the reinforcement body 36D includes an outer periphery 36P having a concavo-convex outline. The reinforcement body 36D includes an annular part 36H and a plurality of teeth 36T. The plurality of teeth 36T extends radially outwardly from the annular part 36H. The plurality of teeth 36T defines the concavo-convex outline.

The reinforcement body 36D is configured to pivot integrally with the guide body 36C about the chain-guide axis A3. The reinforcement body 36D is configured to transmit the biasing force from the second end 92C of the chain-guide biasing member 92 to the guide body 36C.

As seen in FIG. 14, the projection 84 is integrally provided with the guide body 36C of the first guide member 36A of the guide member 36 as a one-piece unitary member. However, the projection 84 can be a separate member from the guide body 36C of the first guide member 36A of the guide member 36.

Modifications

The positional relationships between the motor unit 50, the circuit board 62, the electrical user interface 64, and the informing unit 68 are not limited to the above embodiment. For example, as seen in FIGS. 19 and 20, the motor unit 50 can be at least partly provided between the informing unit 68 and the circuit board 62 in the reference direction D1 perpendicular to the center plane CP of the circuit board 62.

Figure 19:
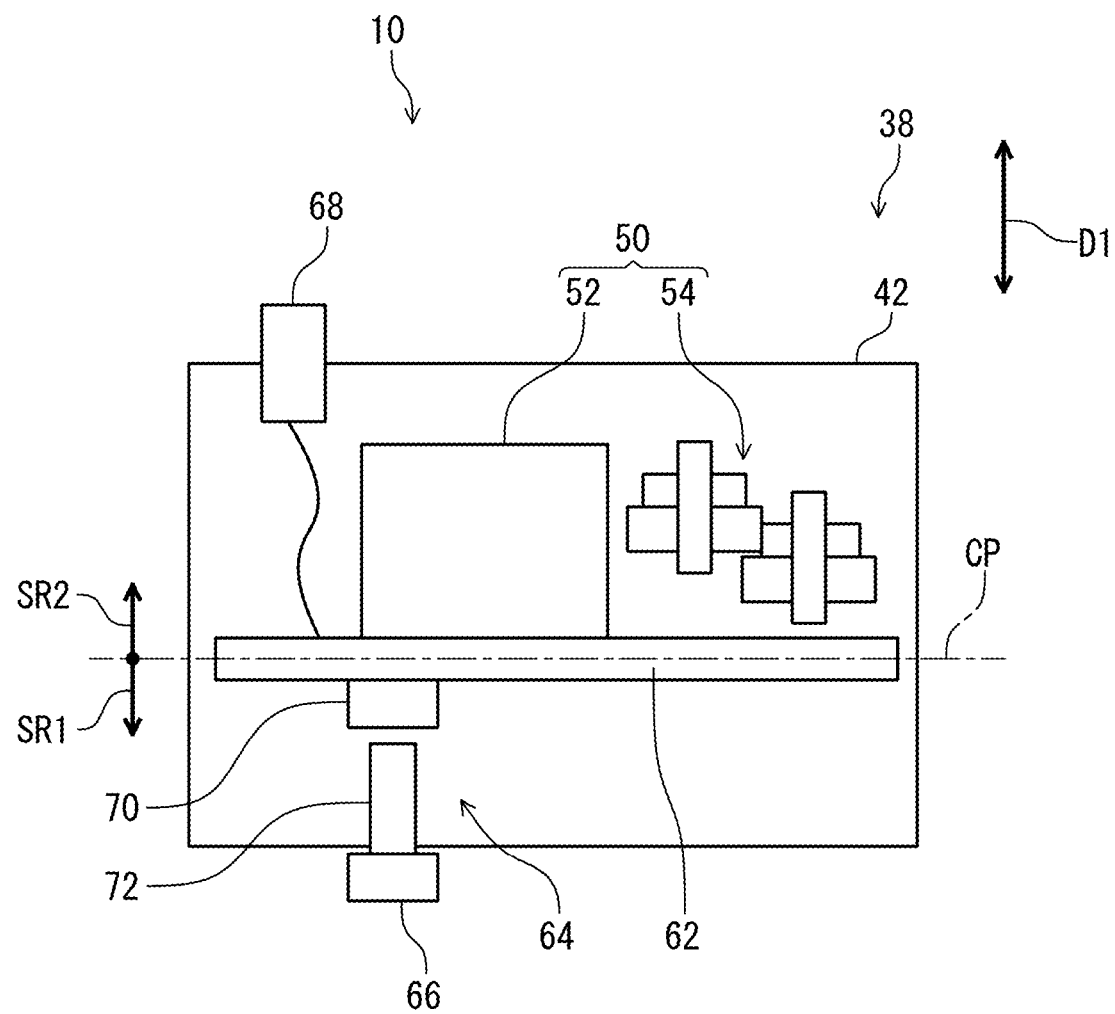
FIG. 19 is a schematic diagram of a bicycle derailleur in accordance with a modification.

As seen in FIG. 19, the motor unit 50 can be at least partly provided between the circuit board 62 and the informing unit 68 in the reference direction D1. In this modification, the light emitter 68A and the light transmission member 68B are integrally provided with each other as a single unit. The informing unit 68 is spaced apart from the circuit board 62 and is attached to the motor housing 42. The informing unit 68 is electrically connected to the circuit board 62 with a wire. The informing unit 68 and the motor unit 50 are provided in the second spatial region SR2.

Figure 20:
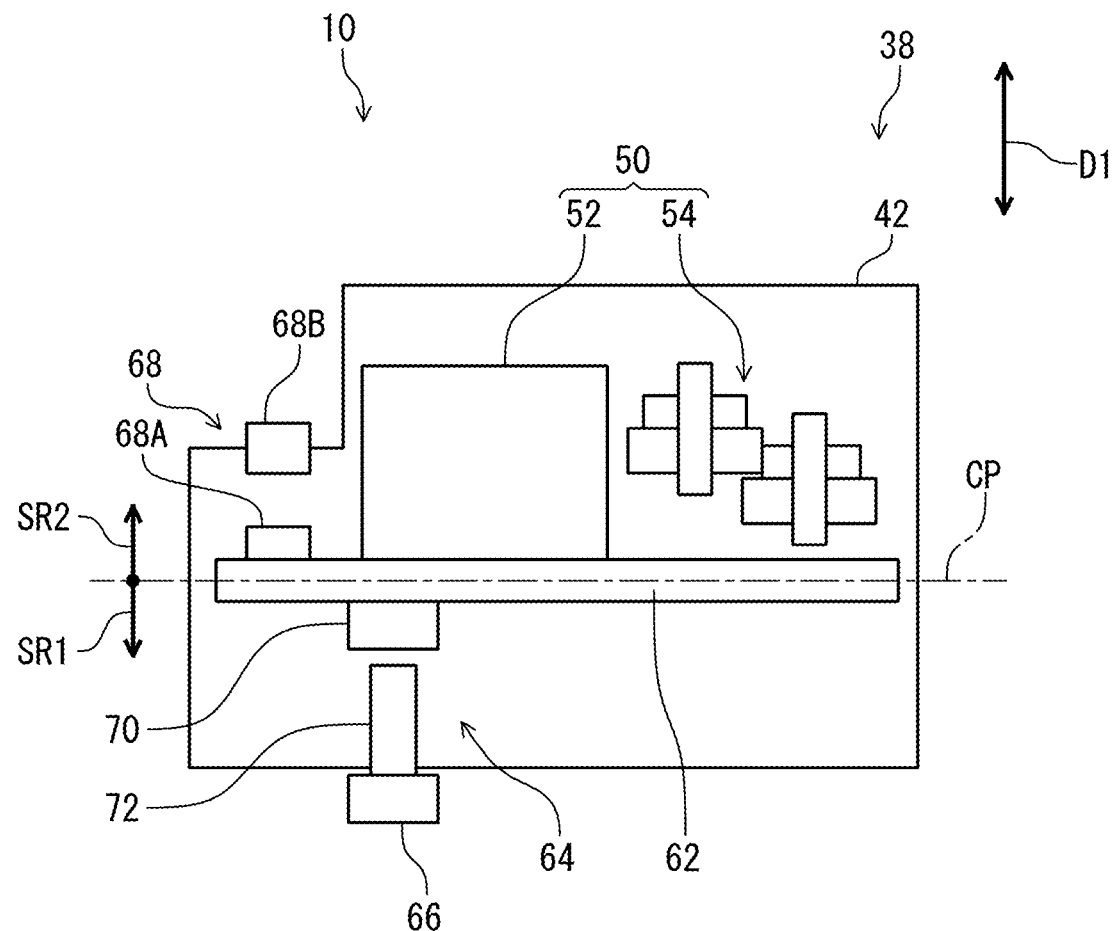
FIG. 20 is a schematic diagram of a bicycle derailleur in accordance with another modification.

As seen in FIG. 20, the motor unit 50 can be at least partly provided between the circuit board 62 and the informing unit 68 in the reference direction D1. In this modification, the light emitter 68A is spaced apart from the light transmission member 68B. The motor unit 50 is provided in the second spatial region SR2.

In the above embodiment and modifications, the electrical user interface 64 is configured to be provided to at least one of the base member 12 and the movable member 14. The circuit board 62 and the electrical user interface 64 are provided to at least one of the base member 12 and the movable member 14. The motor unit 50 is provided to at least one of the base member 12 and the movable member 14. The informing unit 68 is provided to at least one of the base member 12 and the movable member 14. Specifically, the circuit board 62, the electrical user interface 64, the motor unit 50, and the informing unit 68 are provided to the base member 12. However, the circuit board 62 can be provided to the movable member 14 or both the base member 12 and the movable member 14. The electrical user interface 64 can be provided to the movable member 14 or both the base member 12 and the movable member 14. The motor unit 50 can be provided to the movable member 14 or both the base member 12 and the movable member 14. The informing unit 68 can be provided to the movable member 14 or both the base member 12 and the movable member 14.

Figure 21:
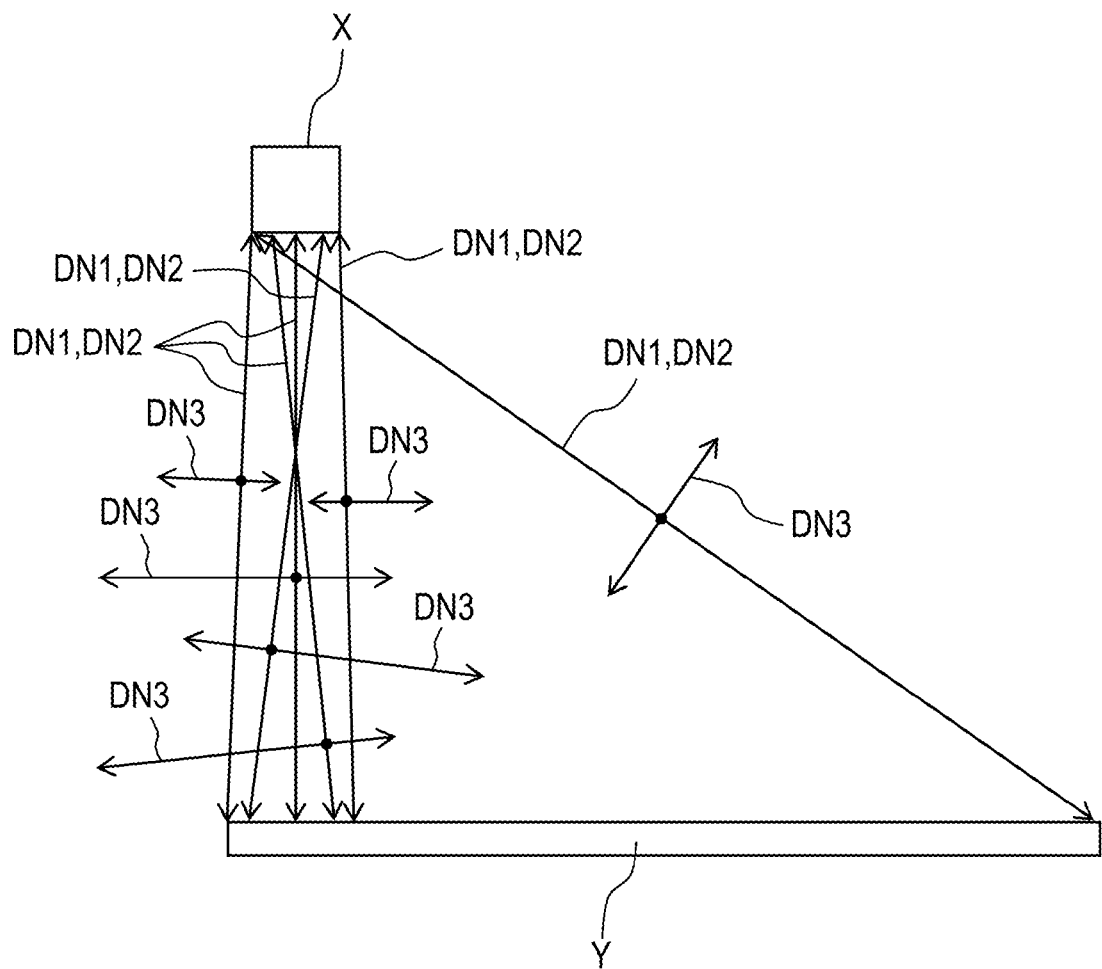
FIG. 21 is a schematic diagram showing a first direction defined from a first element toward a second element or the second element toward the first element.

As seen in FIG. 21, the first directions D21, D22, D31, D32, D41, and D42 can be three-dimensionally defined as every direction between two elements. For example, in a case where a first direction DN1 or DN2 is defined from a first element X toward a second element Y or from the second element Y toward the first element X, the first directions DN1 and DN2 are three-dimensionally defined as every direction between the first element X and the second element Y. As seen in FIGS. 7 and 10, in the above embodiment, the first directions D21, D22, D31, D32, D41, and D42 are defined parallel to the reference direction D1 perpendicular to the center plane CP of the circuit board 62. However, each of the first directions D21, D22, D31, D32, D41, and D42 can be defined to be non-parallel to the reference direction D1 perpendicular to the center plane CP of the circuit board 62.

Figure 22:
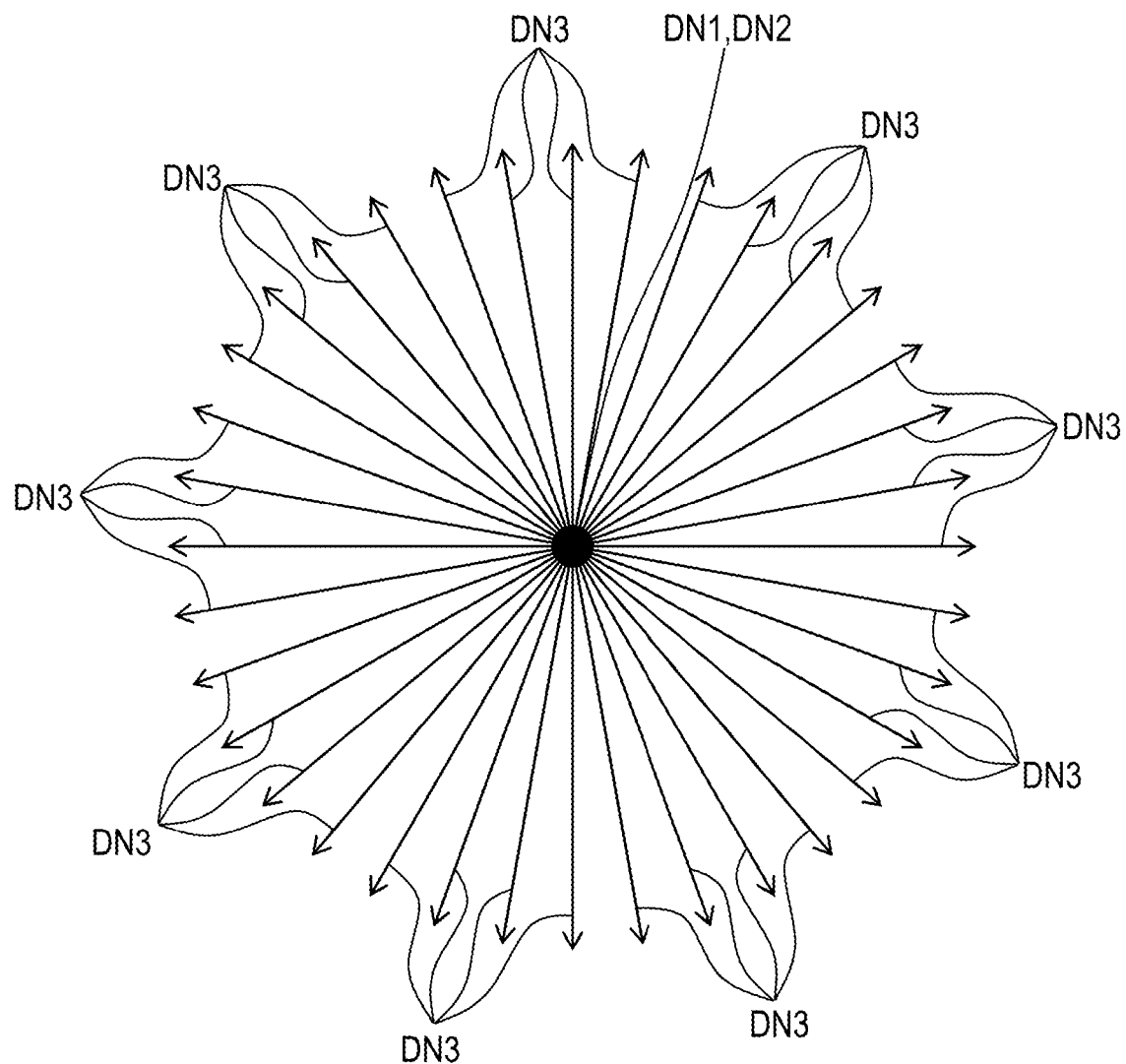
FIG. 22 is a schematic diagram showing a second direction defined to be perpendicular to the first direction.

As seen in FIG. 22, a plurality of second directions DN3 is defined to be perpendicular to the first direction DN1 or DN2. The plurality of second directions DN3 includes all directions radially extending with respect to the first direction DN1 or DN2.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
a circuit board having a center plane that bisects a thickness of the circuit board;

a motor unit configured to generate rotational force and configured to be electrically connected to the circuit board, the motor unit being disposed in a first spatial region with respect to the center plane of the circuit board;

an electrical port configured to be connected to an electric cable, the electrical port being disposed in a second spatial region opposite to the first spatial region with respect to the center plane of the circuit board; and an informing unit configured to inform a user of information and configured to be electrically connected to the circuit board, the informing unit being disposed in the second spatial region.

2. The bicycle derailleur according to claim 1, wherein the electrical port is configured to be connected to an electric power source through the electric cable.

3. The bicycle derailleur according to claim 2, wherein the electric power source is mounted on the bicycle frame.

4. The bicycle derailleur according to claim 2, wherein the electric port is configured to transmit electric power to the electric power source through the electric cable.

5. The bicycle derailleur according to claim 1, wherein the informing unit includes
a light emitter configured to emit light and configured to be electrically connected to the circuit board, and
a light transmission member configured to transmit light emitted from the light emitter.

6. The bicycle derailleur according to claim 1, wherein the motor unit includes
a motor configured to generate rotational force, and
a gear structure configured to change the rotational force based on a reduction ratio.

7. The bicycle derailleur according to claim 6, wherein the motor includes an output shaft, and
the gear structure includes at least one shaft non-parallel to the output shaft.

8. The bicycle derailleur according to claim 7, wherein the gear structure includes at least three shafts.

9. The bicycle derailleur according to claim 8, further comprising
a base member configured to be mounted to a bicycle frame;
a movable member movably coupled to the base member;
a linkage structure including a second link pin; and
a first gear secured to the second link pin and meshed with a second gear secured to one shaft of the gear structure.

10. The bicycle derailleur according to claim 1, further comprising
an electrical user interface including a user accessing portion configured to receive a user input, the electrical user interface being disposed in the first spatial region.

11. The bicycle derailleur according to claim 10, wherein
a first direction is defined from the circuit board toward the electrical user interface or from the electrical user interface toward the circuit board,
a plurality of second directions is defined to be perpendicular to the first direction, and
the motor unit is at least partly provided between the user accessing portion of the electrical user interface and the circuit board when viewed in at least one of the plurality of second directions.

12. The bicycle derailleur according to claim 11, wherein the motor unit includes
a motor configured to generate rotational force, and
a gear structure configured to change the rotational force based on a reduction ratio, and
the gear structure is at least partly provided between the user accessing portion of the electrical user interface and the circuit board when viewed in at least one of the plurality of second directions.

13. The bicycle derailleur according to claim 1, further comprising
a base member configured to be mounted to a bicycle frame, wherein
the electrical port is configured to be provided to at least one of the motor unit and the base member.

* * * * *